United States Patent
Schlarb et al.

(10) Patent No.: US 9,425,517 B2
(45) Date of Patent: Aug. 23, 2016

(54) METHOD FOR PRODUCING A PANE HAVING AN ELECTRICAL CONNECTION ELEMENT

(75) Inventors: Andreas Schlarb, Wuppertal (DE); Bernhard Reul, Herzogenrath (DE); Mitja Rateiczak, Wuerselen (DE); Lothar Lesmeister, Landgraaf (NL)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 91 days.

(21) Appl. No.: 14/125,904

(22) PCT Filed: May 29, 2012

(86) PCT No.: PCT/EP2012/059950
§ 371 (c)(1),
(2), (4) Date: Feb. 21, 2014

(87) PCT Pub. No.: WO2013/004434
PCT Pub. Date: Jan. 10, 2013

(65) Prior Publication Data
US 2014/0158424 A1    Jun. 12, 2014

(30) Foreign Application Priority Data
Jul. 4, 2011    (EP) ..................................... 11172484

(51) Int. Cl.
*H01R 4/02* (2006.01)
*B23K 1/00* (2006.01)
(Continued)

(52) U.S. Cl.
CPC ................ *H01R 4/02* (2013.01); *B23K 1/0008* (2013.01); *B23K 1/19* (2013.01); *B23K 35/0244* (2013.01); *B23K 35/26* (2013.01); *B23K 35/36* (2013.01);
(Continued)

(58) Field of Classification Search
CPC .... H01R 4/02; H01R 43/0256; B23K 1/0008; B23K 35/0266; B23K 35/362
USPC .................................. 174/250, 260; 228/223
See application file for complete search history.

(56) References Cited

U.S. PATENT DOCUMENTS

| | | |
|---|---|---|
| 5,177,134 A | 1/1993 | Mullen, III et al. |
| 2005/0112291 A1 | 5/2005 | Okajima et al. |

(Continued)

FOREIGN PATENT DOCUMENTS

| | | |
|---|---|---|
| CN | 1420941 A | 5/2003 |
| CN | 101065993 A | 10/2007 |

(Continued)

OTHER PUBLICATIONS

PCT Written Opinion mailed on Sep. 5, 2012 for PCT/EP2012/059950 filed on May 29, 2012 in the name of Saint-Gobain Glass France (English+German).

(Continued)

*Primary Examiner* — Timothy Thompson
*Assistant Examiner* — Amol Patel
(74) *Attorney, Agent, or Firm* — Steinfl & Bruno, LLP

(57) ABSTRACT

A method of producing a pane having at least one electrical connection element is described. The method includes: applying soldering compound to at least one contact face of the connection element, arranging the connection element over the soldering compound on a region of an electrically conductive structure on a substrate, and connecting the connection element to the electrically conductive structure by means of the soldering compound with introduction of heat.

17 Claims, 15 Drawing Sheets

Figure 1:
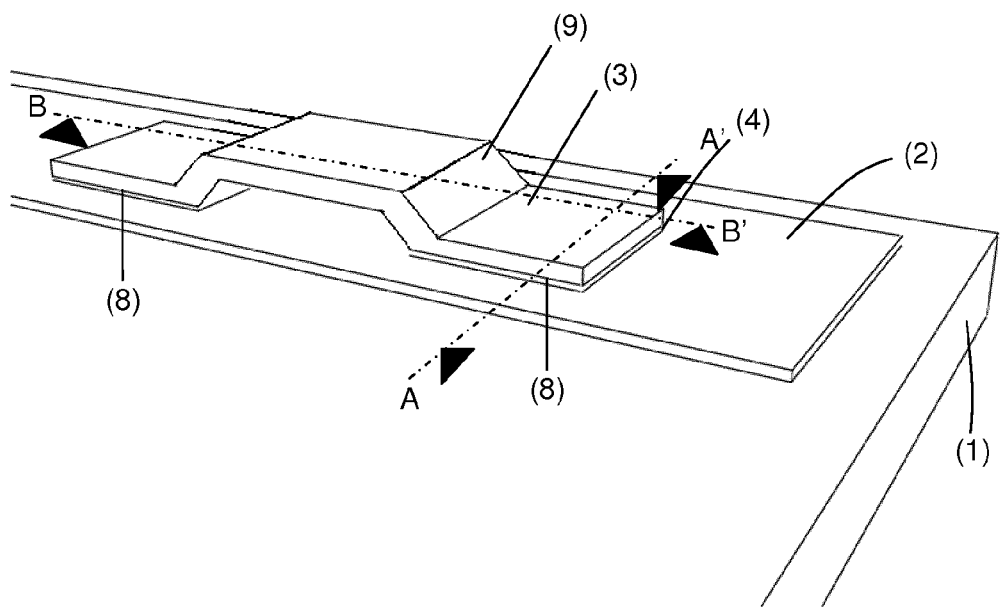

(51) Int. Cl.
  *B23K 35/26* (2006.01)
  *B23K 35/40* (2006.01)
  *H05B 3/84* (2006.01)
  *B23K 35/36* (2006.01)
  *B23K 35/362* (2006.01)
  *B23K 35/02* (2006.01)
  *H01R 43/02* (2006.01)
  *B23K 1/19* (2006.01)
  *C22C 12/00* (2006.01)
  *C22C 13/00* (2006.01)
  *C22C 38/18* (2006.01)

(52) U.S. Cl.
  CPC ............ *B23K 35/362* (2013.01); *B23K 35/40* (2013.01); *C22C 12/00* (2013.01); *C22C 13/00* (2013.01); *C22C 38/18* (2013.01); *H01R 43/0256* (2013.01); *H05B 3/84* (2013.01); *B23K 2201/006* (2013.01); *H05B 2203/016* (2013.01)

(56) References Cited

U.S. PATENT DOCUMENTS

| | | | |
|---|---|---|---|
| 2007/0105412 A1* | 5/2007 | Hoepfner | C22C 1/002 439/83 |
| 2007/0224842 A1 | 9/2007 | Hoepfner et al. | |
| 2008/0164248 A1* | 7/2008 | Reul | B23K 1/002 219/617 |
| 2012/0318566 A1 | 12/2012 | Reul et al. | |

FOREIGN PATENT DOCUMENTS

| | | | |
|---|---|---|---|
| CN | 101244686 A | 8/2008 | |
| DE | 4207419 | 10/1992 | |
| DE | 29722028 | 3/1998 | |
| DE | 29722028 U1 * | 3/1998 | ............... H01R 4/02 |
| DE | 102004057630 | 3/2006 | |
| EP | 1508941 | 2/2005 | |
| EP | 1942703 | 7/2008 | |
| EP | 2339894 | 9/2011 | |
| EP | 2365730 | 9/2011 | |
| JP | H01-225005 A | 9/1989 | |
| JP | H06-503039 A | 4/1994 | |
| JP | 2001203020 A | 7/2001 | |
| JP | 2008110365 A * | 5/2008 | |
| JP | 2008521609 A | 6/2008 | |
| JP | 2008218399 A | 9/2008 | |
| JP | 2009105293 A * | 5/2009 | |
| KR | 1020070084577 A | 8/2007 | |
| WO | 2003036835 A1 | 4/2003 | |
| WO | 2004/068643 | 8/2004 | |

OTHER PUBLICATIONS

PCT International Search Report mailed on Sep. 5, 2012 for PCT/EP2012/059950 filed on May 29, 2012 in the name of Saint-Gobain Glass France.

* cited by examiner

A - A'

C - C'

METHOD FOR PRODUCING A PANE HAVING AN ELECTRICAL CONNECTION ELEMENT

CROSS REFERENCE TO RELATED APPLICATIONS

The present application is the US national stage of International Patent Application PCT/EP2012/059950 filed on May 29, 2012 which, in turn, claims priority to European Patent Application EP 11172484.5 filed on Jul. 4, 2011.

The invention relates to an economical and environmentally friendly method of producing a pane with an electrical connection element, an electrical connection element, and the use of the pane.

The invention further relates to a method of producing a pane with an electrical connection element for motor vehicles with electrically conductive structures such as, for instance, heating conductors or antenna conductors. The electrically conductive structures are customarily connected to the onboard electrical system via soldered-on electrical connection elements. Due to different coefficients of thermal expansion of the materials used, mechanical stresses occur that strain the panes and can cause breakage of the pane during production and operation.

Lead-containing solders have high ductility that can compensate the mechanical stresses occurring between an electrical connection element and the pane by plastic deformation. Moreover, the high ductility enables shaping the lead-containing solder material around a flux core before the soldering process. However, because of the End of Life Vehicles Directive 2000/53/EC, lead-containing solders have to be replaced by lead-free solders within the EC. The directive is referred to, in summary, by the acronym ELV (End of Life Vehicles). The objective is to ban extremely problematic components from products resulting from the massive increase in disposable electronics. The substances affected are lead, mercury, and cadmium. This relates, among other things, to the implementation of lead-free soldering materials in electrical applications on glass and the introduction of corresponding replacement products.

EP 1 942 703 A2 discloses an electrical connection element on panes of motor vehicles, wherein the difference in the coefficient of thermal expansion of the pane and the electrical connection element is $<5 \times 10^{-6}/°$ C. and the connection element contains predominantly titanium. In order to enable adequate mechanical stability and processability, it is proposed to use an excess of solder material. The excess of solder material flows out from the intermediate space between the connection element and the electrically conductive structure. The excess of solder material causes high mechanical stresses in the glass pane. These mechanical stresses ultimately result in breakage of the pane.

For the soldering, a flux is added to the solder material. Through chemical reactions, the flux removes oxides on the surfaces to be connected and prevents new oxide formation during the soldering process. Moreover, the flux reduces the surface tension of the liquid solder. Because of their high ductility, lead-containing solders can be disposed around a strand of the flux. Solder material and flux can be portioned together. The flux core is protected against oxidation through atmospheric oxygen. Moreover, the flux cannot be lost during transport of the solder material.

Many leadfree solders cannot be disposed around a flux core. For example, many bismuth-containing solders are too brittle and many indium-containing solders are too soft and, consequently, cannot be shaped around a flux core. According to the prior art, in this case, the flux is applied to the surface of the solder material before the soldering process. Thus, the flux is not protected against atmospheric influences and can be lost during transport of the solder material, for example, through abrasion. In addition, the amount of flux that can be applied to the solder material is limited.

From DE 29722028 U1, an electrical connection element that is provided with a pre-portioned solder material is known. A flux is disposed in the interior of the solder material portion. Such a solder material portion with a flux reservoir in its interior necessitates expensive production processes. In addition, with many leadfree solder materials, the same problems develop due to their brittleness or softness as with shaping the solder material around a conventional flux core. From EP 1508941 A2, a sleeve-shaped solder material is known, wherein a flux is disposed in the interior of the sleeve. DE 102004057630 B3 mentions a leadfree solder reservoir with integrated flux. However, it is not described how the flux is to be advantageously integrated.

One object of the present invention is to provide an economical and environmentally friendly method of producing a pane with an electrical connection element, whereby critical mechanical stresses in the pane are avoided and the loss of flux during transport solder material is prevented.

A further object of the present invention is to provide an electrical connection element that can be connected to a pane, whereby critical mechanical stresses in the pane are avoided.

The object of the present invention is accomplished according to the invention by a method according to independent claim 1. Preferred embodiments emerge from the subclaims.

The method according to the invention for producing a pane with at least one electrical connection element comprises the following process steps:

a) solder material is applied to at least one contact surface of the connection element, with the solder material having at least one recess with a flux, b) the connection element is disposed over the solder material on a portion of an electrically conductive structure on a substrate, and c) the connection element is connected to the electrically conductive structure by means of the solder material under input of heat.

The solder material is preferably shaped as platelets. The solder material has two contact sides opposite each other, with the solder material being connected to the contact surface of the connection element via one of the two contact sides. The solder material is brought into contact with the electrically conductive structure on the substrate via the other contact side. The first contact side is preferably flat or has at least one flat portion. The recess in the solder material is introduced via a portion of the second contact side. The recess is thus introduced into the solder material on its surface and is consequently implemented as an indentation in the second contact side of the solder material. The portion of the second contact side via which no recess is introduced into the solder material is preferably flat. The solder material can be connected to the contact surface of the connection element via the first or second contact side.

A plurality of recesses can also be introduced into the solder material via a plurality of portions of the second contact side. In this manner, the flux can advantageously be distributed over the solder material. The solder material can, for example, have from 2 to 10 recesses.

The contact sides of the solder material can, for example, be rectangular, oval, elliptical, circular, rectangular with rounded corners, or rectangular with two semicircles disposed on opposite sides. Preferably, the contact sides have the same shape as the contact surface of the connection element. The length and width of each contact side of the solder material are preferably less than or equal to the length and width of the contact surface of the connection element. The length and the width of the contact sides of the solder material are particularly preferably smaller by 0.1 mm to 3 mm, very particularly preferably smaller by 0.5 mm to 1 mm than the length and the width of the contact surface of the connection element. The layer thickness of the solder material between the two contact sides is preferably from 0.1 mm to 0.5 mm, particularly preferably from 0.2 to 0.4 mm, and very particularly preferably from 0.3 to 0.4 mm.

The portion of the second contact side of the solder material via which the recess is introduced into the solder material can be completely surrounded in the plane of the contact side by the flat portion of the contact side. The length and width of the portion is preferably from 0.1 mm to 23 mm, particularly preferably from 0.2 mm to 7 mm.

In an alternative embodiment of the invention, the portion of the second contact side via which the recess is introduced into the solder material runs from one edge of the contact side to the opposite edge of the contact side. The portion of the second contact side of the solder material via which the recess is introduced into the solder material can, for example, be rectangular, oval, elliptical, circular, or combinations thereof.

Each recess can, in the cross-section perpendicular to the contact sides of the solder material, have the shape at least of a rectangle. In a preferred embodiment of the invention, each recess has, in the cross-section perpendicular to the contact sides of the solder material, the shape at least of a trapezoid, a triangle, a segment of a oval, a segment of an ellipse, or a segment of a circle. The cross-sectional area of each recess parallel to the contact side of the solder material via which the recess is introduced becomes smaller with an increased distance from this contact side. This is particularly advantageous with regard to the stability of the solder material in the edge regions of the platelet.

Alternatively, the cross-sectional area of each recess parallel to the contact side of the solder material via which the recess is introduced becomes larger with an increased distance from this contact side. This is particularly advantageous with regard to the stability of the flux in the recess. The flux can less readily fall out of the recess.

The depth of the recess is preferably from 0.02 mm to 0.3 mm, particularly preferably from 0.05 mm to 0.25 mm. In an advantageous embodiment of the invention, a plurality of recesses are introduced into the solder material, with at least some of the recesses having different depths. The depth of a recess is greater, the greater the least distance of the recess from an edge of the contact side of the solder material. This is particularly advantageous with regard to the stability of the solder material in the edge regions of the platelet.

The recess is preferably introduced into the solder material by rolling. Alternatively, the recess is preferably introduced into the solder material by pressing in, particularly preferably by embossing, or by milling.

In the method according to the invention, an electrical connection element is provided with at least one contact surface, with solder material disposed on the contact surface, at least one recess disposed in the solder material, and at least one flux disposed in the recess.

In a preferred embodiment of the method according to the invention, for this, the solder material is first formed as a platelet with two contact sides, at least one recess, predefined layer thickness and volume. Particularly preferably, the solder material is rolled between two rollers to form a strip, with the surface of one roller designed structured such that at least one recess is introduced into one of the surfaces of the solder material facing the rollers. The platelets of the solder material are obtained from the strip with the recess by cutting or stamping.

Alternatively, the solder material can be rolled to form a strip with flat surfaces facing the rollers and the platelets of the solder material can be cut or stamped from the strip. Thereafter, the recess is introduced into the solder material, preferably pressed in, particularly preferably embossed. The flux is applied on the contact side of the solder material via which the recess is introduced, with the flux disposed at least in the recess. The recess is completely or partially filled with the flux. Thereafter, the solder material is disposed on the contact surface of connection element via one of the two contact sides.

In an alternative preferred embodiment of the method according to the invention, the solder material is first formed as platelets with two contact sides, at least one recess, predefined layer thickness and volume. Thereafter, the solder material is disposed on the contact surface of the connection element via the contact side via which the recess is not introduced into the solder material. Thereafter, the flux is applied on the contact side of the solder material via which the recess is introduced, with the flux disposed at least in the recess.

In an alternative preferred embodiment of the method according to the invention, the solder material is first formed as platelets with two contact sides, at least one recess, predefined layer thickness and volume, and, in the process, the flux is disposed at least in the recess. Particularly preferably, the solder material is rolled between two rollers to form a strip, with the surface of one roller designed structured such that in one of the surfaces of the solder material facing the rollers, at least one recess is introduced. The flux is applied on the surface of the solder material via which the recess is introduced, with the flux disposed at least in the recess. Thereafter, the platelets of the solder material are obtained from the strip with the recess by cutting or stamping, for example. Thereafter, the solder material with the flux is disposed on the contact surface of the connection element.

In an alternative preferred embodiment of the method according to the invention, the solder material is first formed as platelets with two contact sides, predefined layer thickness and volume. Particularly preferably, the solder material is rolled between two rollers to form a strip, with the surfaces of the solder material facing the rollers formed flat. The platelets of the solder material are obtained from the strip by cutting or stamping, for example. Thereafter, the solder material is disposed on the contact surface of the connection element and, thereafter, at least one recess introduced, preferably embossed, into the contact side of solder material facing away from the contact surface. Thereafter, the flux is applied on the contact side of the solder material via which the recess is introduced, with the flux disposed at least in the recess.

In an alternative preferred embodiment of the method according to the invention, the solder material is first formed as platelets with two contact sides, predefined layer thickness and volume. Thereafter, the solder material is disposed on the contact surface of the connection element and, at the same time, at least one recess is introduced into the contact side of the solder material facing away from the contact surface. Particularly preferably, the solder material is pressed on with an embossing punch on the contact surface. Thereafter, the flux is applied on the contact side of the solder material via which the recess is introduced, with the flux disposed at least in the recess.

A plurality of connection elements can be connected to each other chain-like during the application of the solder material. The individual connection elements are separated out of the chain after the application of the solder material. The recess can be introduced into the solder material before the application of the solder material on the connection elements connected to each other. Alternatively, the recess can be introduced into the solder material after the application of the solder material on the connection elements connected to each other or after the separation of the individual connection elements out of the chain.

The advantage of the invention results from the fact that the flux is disposed at least in the recess of the solder material. The recess thus serves as a flux reservoir. There, the flux is protected against loss, for example, through abrasion, during the transport of the connection element. Moreover, by means of the recess, the surface of the solder material is enlarged. Thus, a larger amount of flux can be disposed on the solder material.

The solder material can be applied by pressing onto the contact surface of the connection element or by pointwise soldering onto the contact surface of the connection element.

In an alternative embodiment of the invention, at least one indentation is introduced into the connection element in the region of the contact surface. The cross-sectional area of the indentation parallel to the contact surface increases at least in a portion of the indentation with an increasing distance from the contact surface. The indentations preferably have a depth from 0.05 mm to 0.5 mm, particularly preferably from 0.1 to 0.3 mm. At least one bulge is disposed on the first contact side of the solder material. The cross-sectional shape and the cross-sectional area are selected such that the bulge can be inserted completely through the minimum cross-sectional area of the indentation of the connection element into the indentation. The height of the bulge is greater than the depth of the indentation. Preferably, the height of the bulge is from 0.1 mm to 0.7 mm, particularly preferably from 0.15 mm to 0.5 mm. The volume of the bulge is less than or equal to the volume of the indentation. The bulge can, for example, be shaped as a rectangular solid, a cube, a cylinder, a pyramid, a segment of a rotational ellipsoid, or as a segment of a sphere. For connecting, the solder material is pressed via the first contact side onto the contact surface of the connection element, with the bulge of the solder material positioned in the indentation of the connection element. During the pressing of the solder material, the bulge changes shape in the indentation such that the maximum cross-sectional area of the bulge is larger than the minimum cross-sectional area of the indentation. Thus, the connection of the solder material to the connection element is durably stable. A flux can be disposed in the indentation of the connection element before the connecting of the connection element to the solder material.

In an alternative embodiment of the invention, at least one portion of the contact surface of the connection element has a sawtooth profile. Preferably, the portion of the contact surface is configured in the form of two or more rows with a sawtooth profile, wherein the sawtooth profiles of two adjacent rows run in opposite directions. By pressing the solder material onto the contact surface, the solder material is tilted over the contact side into the sawtooth profile of the contact surface. This makes the connection of solder material with the connection element durably stable. Before the connection of the connection element to the solder material, a flux can be disposed on the sawtooth profile of the connection element.

In an advantageous embodiment of the invention, the connection element is connected via a contact surface to the entire surface of a portion of the electrically conductive structure. The shape of the contact surface preferably has no corners. This is particularly advantageous with regard to the minimization of critical tensile stresses in the pane. The contact surface can, for example, have an oval, preferably an elliptical, and, in particular, a circular structure. Alternatively, the contact surface can have a convex polygonal shape, preferably a rectangular shape, with rounded corners, with the rounded corners having a radius of curvature of r>0.5 mm, preferably of r>1 mm. Alternatively, the contact surface can be implemented as a rectangle with two semicircles disposed on opposite sides.

In another advantageous embodiment of the invention, the connection element is connected to portions of the electrically conductive structure via two contact surfaces, with the contact surfaces connected to each other via a bridge. Each contact surface can, for example, be shaped as a rectangle. Alternatively, the shape of each of the two contact surfaces can have at least one segment of an oval, of an ellipse, or of a circle with a central angle from 90° to 360°, preferably from 140° to 360°, for example, from 180° to 330° or from 200° to 330°. Each contact surface can have an oval, preferably an elliptical structure. Particularly preferably, each contact surface is shaped as a circle. Alternatively, each contact surface is shaped as a circular segment with a central angle of at least 180°, preferably at least 200°, particularly preferably at least 220°, and very particularly preferably at least 230°. The circular segment can have, for example, a central angle from 180° to 350°, preferably from 200° to 330°, particularly preferably from 210° to 310°.

In another advantageous embodiment of the connection element according to the invention, each contact surface is designed as a rectangle with two semi-ovals, preferably semi-ellipses, particularly preferably semicircles, arranged on opposite sides.

The connection element is, in the plan view, for example, preferably 1 mm to 50 mm long and wide and, particularly preferably 2 mm to 30 mm long and wide, and very particularly preferably 2 mm to 8 mm wide and 10 mm to 24 mm long.

Two contact surfaces connected to each other by a bridge are, for example, preferably 1 mm to 15 mm long and wide and particularly preferably 2 mm to 8 mm long and wide.

The bridge between the contact surfaces is preferably shaped flat in segments. "Flat" means that the bottom of the connection element forms one plane. The angle between the surface of the substrate and the bottom of each flat segment of the bridge directly adjacent a contact surface is less than or equal to 90°, preferably between 1° and 85°, and particularly preferably between 3° and 60°. The bridge is shaped such that each flat segment adjacent a contact surface is inclined in the direction away from the directly adjacent contact surface. The bridge can also be curved. The bridge can have a single direction of curvature and the profile of an oval arc, preferably the profile of an elliptical arc, and particularly preferably the profile of a circular arc. The radius of curvature of the circular arc is, for example, preferably from 5 mm to 15 mm, with a connection element length of 24 mm. The direction of curvature of the bridge can also be changed. The bridge does not have to have a constant width.

The solder material is preferably leadfree, i.e., contains no lead. This is particularly advantageous with regard to the environmental impact of the pane with an electrical connection element according to the invention. Leadfree solder materials can often not be shaped around a flux core, as is usual with lead-containing solder materials. The recesses according to the invention in the solder material to accommodate the flux are, consequently, particularly advantageous in the case of leadfree solder materials. The solder material according to the invention contains, preferably, tin and bismuth, indium, zinc, copper, silver, or compositions thereof. The proportion of tin in the solder composition according to the invention is from 3 wt.-% to 99.5 wt.-%, preferably from 10 wt.-% to 95.5 wt.-%, particularly preferably from 15 wt.-% to 60 wt.-%. The proportion of bismuth, indium, zinc, copper, silver, or compositions thereof in the solder composition according to the invention is from 0.5 wt.-% to 97 wt.-%, preferably 10 wt.-% to 67 wt.-%, whereby the proportion of bismuth, indium, zinc, copper, or silver can be 0 wt.-%. The solder composition according to the invention can contain nickel, germanium, aluminum, or phosphorus at a proportion of 0 wt.-% to 5 wt.-%. The solder composition according to the invention contains, very particularly preferably, Bi40Sn57Ag3, Sn40Bi57Ag3, Bi59Sn40Ag1, Bi57Sn42Ag1, In97Ag3, Sn95.5Ag3.8Cu0.7, Bi67In33, Bi33In50Sn17, Sn77.2In20Ag2.8, Sn95Ag4Cu1, SN99Cu1, Sn96.5Ag3.5, or mixtures thereof.

The flux according to the invention is, at the time of application on the solder material, preferably dissolved in a solvent. The solution of the flux contains preferably at least 50 wt.-% to 95 wt.-% solvent, preferably alcohol, particularly preferably propan-2-ol or ethanol, 0 wt.-% to 30 wt.-% colophonium, 0 wt.-% to 5 wt.-% dicarboxylic acids, 0 wt.-% to 8 wt.-% terpenes, preferably orange terpenes, and 0 wt.-% to 7 wt.-% solvent naphta. The solution of the flux can contain additional additives, for example, alcohols, resins, and/or halides. After application on the solder material, the solvent is removed preferably by evaporation. The proportion of flux in the totality of solder material and flux is from 0.1 wt.-% to 5 wt.-%, preferably from 0.3 wt.-% to 4 wt.-%, and particularly preferably from 0.5 wt.-% to 3 wt.-%.

The layer thickness of the solder according to the invention is preferably $<3.0\times10^{-4}$ m. After the soldering process, the solder material flows out with an outflow width of <1 mm from the intermediate space between the connection element and the electrically conductive structure. In a preferred embodiment, the maximum outflow width is preferably less than 0.5 mm and, in particular, roughly 0 mm. This is particularly advantageous with regard to the reduction of mechanical stresses in the pane, the adhesion of the connection element, and the reduction in the amount of solder.

The maximum outflow width is defined as the distance between the outer edges of the connection element and the point of the solder material crossover, at which the solder material drops below a layer thickness of 50 μm. The maximum outflow width is measured on the solidified solder material after the soldering process.

A desired maximum outflow width is obtained through a suitable selection of solder material volume and vertical distance between the connection element and the electrically conductive structure, which can be determined by simple experiments. The vertical distance between the connection element and the electrically conductive structure can be predefined by an appropriate process tool, for example, a tool with an integrated spacer.

The maximum outflow width can even be negative, i.e., pulled back into the intermediate space formed by an electrical connection element and an electrically conductive structure.

In an advantageous embodiment of the invention, the maximum outflow width is pulled back in a concave meniscus into the intermediate space formed by the electrical connection element and the electrically conductive structure. A concave meniscus is created, for example, by increasing the vertical distance between the spacer and the conductive structure during the soldering process, while the solder is still fluid.

The substrate contains, preferably, glass, particularly preferably, flat glass, float glass, quartz glass, borosilicate glass, soda lime glass. In an alternative preferred embodiment, the substrate contains polymers, particularly preferably, polyethylene, polypropylene, polycarbonate, polymethyl methacrylate, and/or mixtures thereof.

The substrate has a first coefficient of thermal expansion. The first coefficient of thermal expansion is preferably from $8\times10^{-6}/°$ C. to $9\times10^{-6}/°$ C. The substrate preferably contains glass that has, preferably, a coefficient of thermal expansion from $8.3\times10^{-6}/°$ C. to $9\times10^{-6}/°$ C. in a temperature range from 0° C. to 300° C.

The object of the invention is further accomplished by an electrical connection element with at least one contact surface, wherein
  solder material is disposed on the contact surface,
  at least one recess is disposed in the solder material, and
  a flux is disposed at least in the recess.

The recess is either completely or partially filled with flux.

One or a plurality of indentations can be introduced into the connection element in the region of the contact surface. The indentations can be completely or partially filled with flux.

The connection element according to the invention contains at least an iron-nickel alloy, an iron-nickel-cobalt alloy, or an iron-chromium alloy.

The connection element according to the invention contains preferably at least 50 wt.-% to 89.5 wt.-% iron, 0 wt.-% to 50 wt.-% nickel, 0 wt.-% to 20 wt.-% chromium, 0 wt.-% to 20 wt.-% cobalt, 0 wt.-% to 1.5 wt.-% magnesium, 0 wt.-% to 1 wt.-% silicon, 0 wt.-% to 1 wt.-% carbon, 0 wt.-% to 2 wt.-% manganese, 0 wt.-% to 5 wt.-% molybdenum, 0 wt.-% to 1 wt.-% titanium, 0 wt.-% to 1 wt.-% niobium, 0 wt.-% to 1 wt.-% vanadium, 0 wt.-% to 1 wt.-% aluminum, and/or 0 wt.-% to 1 wt.-% tungsten.

The connection element has a second coefficient of thermal expansion. In an advantageous embodiment of the invention, the difference between the first and the second coefficient of expansion is $\geq 5\times10^{-6}/°$ C. The second coefficient of expansion is, in that case, preferably from $0.1\times10^{-6}/°$ C. to $4\times10^{-6}/°$ C., particularly preferably from $0.3\times10^{-6}/°$ C. to $3\times10^{-6}/°$ C. in a temperature range from 0° C. to 300° C.

The connection element according to the invention contains preferably at least 50 wt.-% to 75 wt.-% iron, 25 wt.-% to 50 wt.-% nickel, 0 wt.-% to 20 wt.-% cobalt, 0 wt.-% to 1.5 wt.-% magnesium, 0 wt.-% to 1 wt.-% silicon, 0 wt.-% to 1 wt.-% carbon, and/or 0 wt.-% to 1 wt.-% manganese. The connection element according to the invention contains preferably chromium, niobium, aluminum, vanadium, tungsten, and titanium at a proportion of 0 wt.-% to 1 wt.-%, molybdenum at a proportion of 0 wt.-% to 5 wt.-%, as well as production-related admixtures. The particular advantage resides in avoiding critical tensile stresses in the substrate. Moreover, the electrical conductivity and the solderability are advantageous.

The connection element according to the invention contains preferably at least 55 wt.-% to 70 wt.-% iron, 30 wt.-% to 45 wt.-% nickel, 0 wt.-% to 5 wt.-% cobalt, 0 wt.-% to 1 wt.-% magnesium, 0 wt.-% to 1 wt.-% silicon, and/or 0 wt.-% to 1 wt.-% carbon. This is particularly advantageous with regard to solderability, electrical conductivity, and the reduction of tensile stresses in the substrate.

The connection element according to the invention contains preferably invar (FeNi). Invar is an iron-nickel alloy with a content of, for example, 36 wt.-% nickel (FeNi36). There is a group of alloys and compounds that have the property of having abnormally small or sometimes negative coefficients of thermal expansion in certain temperature ranges. Fe65Ni35 invar contains 65 wt.-% iron and 35 wt.-% nickel. Up to 1 wt.-% magnesium, silicon, and carbon are usually alloyed to change the mechanical properties. By alloying 5 wt.-% cobalt, the coefficient of thermal expansion can be further reduced. One name for the alloy is Inovco, FeNi33Cu4.5 with an coefficient of expansion (20° C. to 100° C.) of $0.55 \times 10^{-6}/°$ C.

If an alloy such as invar with a very low absolute coefficient of thermal expansion of $<4 \times 10^{6}/°$ C. is used, overcompensation of mechanical stresses occurs by noncritical pressure stresses in the glass or by noncritical tensile stresses in the alloy.

In another advantageous embodiment of the invention, the difference between the first and the second coefficient of expansion is $<5 \times 10^{-6}/°$ C. Because of the small difference between the first and the second coefficient of thermal expansion, critical mechanical stresses in the pane are avoided and better adhesion is obtained. The second coefficient of thermal expansion is, in that case, preferably $4 \times 10^{-6}/°$ C. to $8 \times 10^{-6}/°$ C., particularly preferably $4 \times 10^{-6}/°$ C. to $6 \times 10^{-6}/°$ C. in a temperature range from 0° C. to 300° C.

The connection element according to the invention contains preferably at least 50 wt.-% to 60 wt.-% iron, 25 wt.-% to 35 wt.-% nickel, 15 wt.-% to 20 wt.-% cobalt, 0 wt.-% to 0.5 wt.-% silicon, 0 wt.-% to 0.1 wt.-% carbon, and/or 0 wt.-% to 0.5 wt.-% manganese. The particular advantage resides in the avoidance of mechanical stresses in the substrate, good electrical conductivity, and good solderability.

The connection element according to the invention contains preferably kovar (FeCoNi). Kovar is an iron-nickel-cobalt alloy that has coefficients of thermal expansion of usually roughly $5 \times 10^{-6}/°$ C. The coefficient of thermal expansion is thus less than the coefficient of typical metals. The composition contains, for example, 54 wt.-% iron, 29 wt.-% nickel, and 17 wt.-% cobalt.

The connection element according to the invention contains preferably iron-nickel alloys and/or iron-nickel-cobalt-alloys post-treated thermally by annealing.

In another advantageous embodiment of the invention, the difference between the first and the second coefficient of expansion is likewise $<5 \times 10^{-6}/°$ C. The second coefficient of thermal expansion is preferably from $9 \times 10^{-6}/°$ C. to $13 \times 10^{-6}/°$ C., particularly preferably from $10 \times 10^{-6}/°$ C. to $11.5 \times 10^{-6}/°$ C. in a temperature range from 0° C. to 300° C.

The connection element according to the invention contains preferably at least 50 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, and/or 0 wt.-% to 1 wt.-% titanium. In addition, the connection element can contain admixtures of other elements, including vanadium, aluminum, niobium, and nitrogen.

The connection element according to the invention can also contain at least 66.5 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, 0 wt.-% to 2 wt.-% niobium, and/or 0 wt.-% to 1 wt.-% titanium.

The connection element according to the invention contains preferably at least 65 wt.-% to 89.5 wt.-% iron, 10.5 wt.-% to 20 wt.-% chromium, 0 wt.-% to 0.5 wt.-% carbon, 0 wt.-% to 2.5 wt.-% nickel, 0 wt.-% to 1 wt.-% manganese, 0 wt.-% to 1 wt.-% molybdenum, and/or 0 wt.-% to 1 wt.-% titanium.

The connection element according to the invention can also contain at least 73 wt.-% to 89.5 wt.-% iron, 10.5 wt.-% to 20 wt.-% chromium, 0 wt.-% to 0.5 wt.-% carbon, 0 wt.-% to 2.5 wt.-% nickel, 0 wt.-% to 1 wt.-% manganese, 0 wt.-% to 1 wt.-% molybdenum, 0 wt.-% to 1 wt.-% niobium, and/or 0 wt.-% to 1 wt.-% titanium.

The connection element according to the invention contains preferably at least 75 wt.-% to 84 wt.-% iron, 16 wt.-% to 18.5 wt.-% chromium, 0 wt.-% to 0.1 wt.-% carbon, 0 wt.-% to 1 wt.-% manganese, and/or 0 wt.-% to 1 wt.-% titanium.

The connection element according to the invention can also contain at least 78.5 wt.-% to 84 wt.-% iron, 16 wt.-% to 18.5 wt.-% chromium, 0 wt.-% to 0.1 wt.-% carbon, 0 wt.-% to 1 wt.-% manganese, 0 wt.-% to 1 wt.-% niobium, and/or 0 wt.-% to 1 wt.-% titanium.

The connection element according to the invention contains preferably a chromium-containing steel with a proportion of chromium greater than or equal to 10.5 wt.-% and a coefficient of thermal expansion of $9 \times 10^{-6}/°$ C. to $13 \times 10^{-6}/°$ C. Further alloy components, such as molybdenum, manganese, or niobium, result in improved corrosion stability or altered mechanical properties, such as tensile strength or cold formability.

The advantage of connection elements made of chromium-containing steel compared to connection elements according to the prior art made of titanium resides in the better solderability, which results from the higher thermal conductivity of the chromium-containing steel. Because of this, a more uniform heating of the connection element during the soldering process is obtained. Improved adhesion of the connection element to the pane results. Chromium-containing steel is, moreover, well weldable and has better cold formability. With it, better connecting of the connection element to the onboard electrical system via an electrically conductive material, e.g., copper, by welding or crimping, is possible. Chromium-containing steel is, moreover, more available.

An electrically conductive structure is applied on the substrate, for example, in a screenprinting processes. The electrically conductive structure according to the invention has a layer thickness from 5 μm to 40 μm, preferably from 8 μm to 15 μm, and particularly preferably from 10 μm to 12 μm. The electrically conductive structure according to the invention contains, preferably, silver, particularly preferably, silver particles and glass frits.

The connection element according to the invention is coated, preferably, with nickel, tin, copper, and/or silver. The connection element according to the invention is particularly preferably provided with an adhesion-promoting layer, preferably made of nickel and/or copper, and, additionally, with a solderable wetting layer, preferably made of silver. The connection element according to the invention is coated, very particularly preferably, with 0.1 μm to 0.3 μm nickel and/or 3 μm to 20 μm silver. The connection element can be plated with nickel, tin, copper, and/or silver. Nickel and silver improve the current-carrying capacity and corrosion stability of the connection element and the wetting with the solder material.

The iron-nickel alloy, the iron-nickel-cobalt alloy, or the iron-chromium alloy can also be welded, crimped, or glued as a compensation plate onto a connection element made, for example, of an iron-containing alloy, aluminum, titanium, or copper. As a bimetal, favorable expansion behavior of the connection element relative to the glass expansion can be obtained. The compensation plate is preferably hat-shaped.

The electrical connection element contains, on the surface facing the solder material, a coating that contains copper, zinc, tin, silver, gold, or alloys or layers thereof, preferably silver. This prevents a spreading of the solder material out beyond the coating and limits the outflow width.

The shape of the electrical connection element can form solder reservoirs in the intermediate space of the connection element and the electrically conductive structure. The solder reservoirs and wetting properties of the solder on the connection element prevent the outflow of the solder material from the intermediate space. Solder reservoirs can be rectangular, rounded, or polygonal in design.

The distribution of the soldering heat and, thus, the distribution of the solder material during the soldering process can be defined by the shape of the connection element. Solder material flows to the warmest point. For example, the connection element can have a single or double hat shape in order to distribute the heat advantageously in the connection element during the soldering process.

The introduction of the energy during the electrical connecting of an electrical connection and an electrically conductive structure occurs preferably by means of punches, thermodes, piston soldering, preferably laser soldering, hot air soldering, induction soldering, resistance soldering, and/or with ultrasound.

The connection element is, for example, welded or crimped to a sheet, braided wire, mesh [not shown] made, for example, of copper and connected to the onboard electrical system.

The connection element is preferably used in heated panes or in panes with antennas in buildings, in particular, in automobiles, trains, aircraft, or watercraft, in functional and/or decorative individual pieces. The connection element serves to connect the conducting structures of the pane to electrical systems that are arranged outside the pane. The electrical systems are amplifiers, control units, or voltage sources.

The pane produced according to the method according to the invention is preferably used as a heating pane or a pane with antennas in buildings, in particular in automobiles, trains, aircraft, or watercraft, in functional and/or decorative individual pieces or as built-in parts in furniture and devices.

Figure 2:
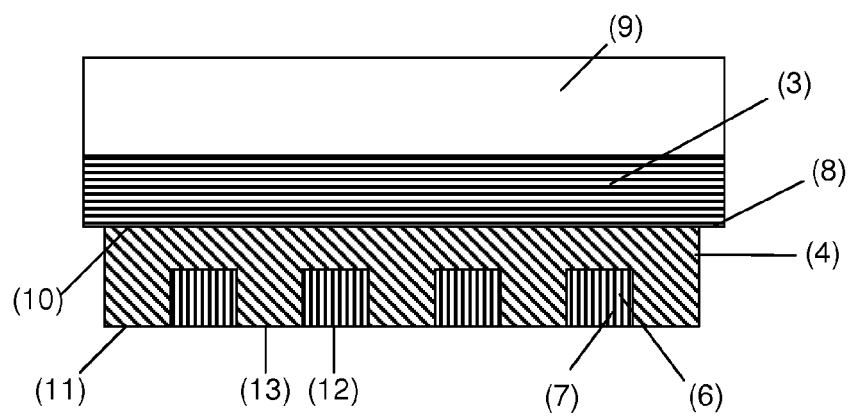
Figure 3:
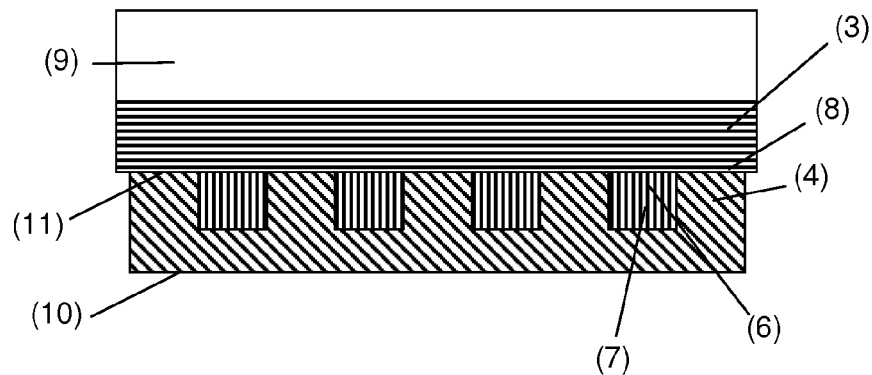
Figure 4:
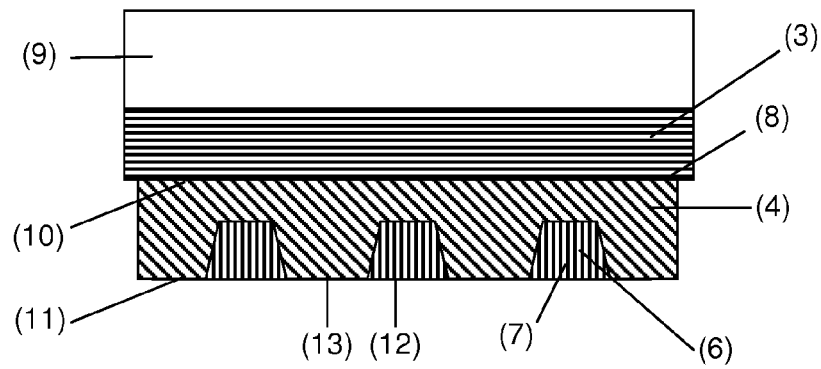
Figure 4A:
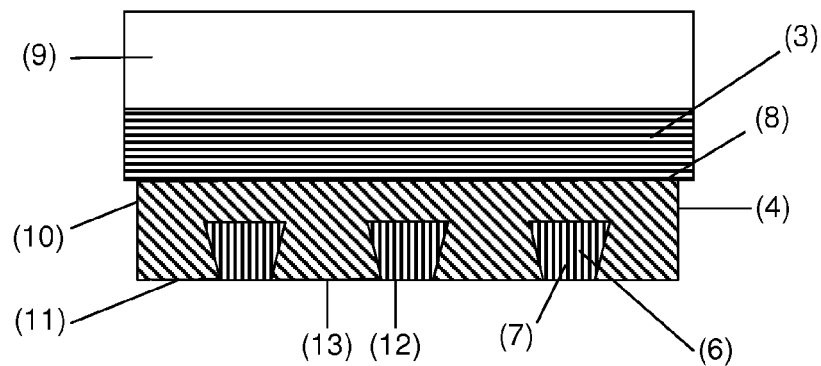
Figure 5:
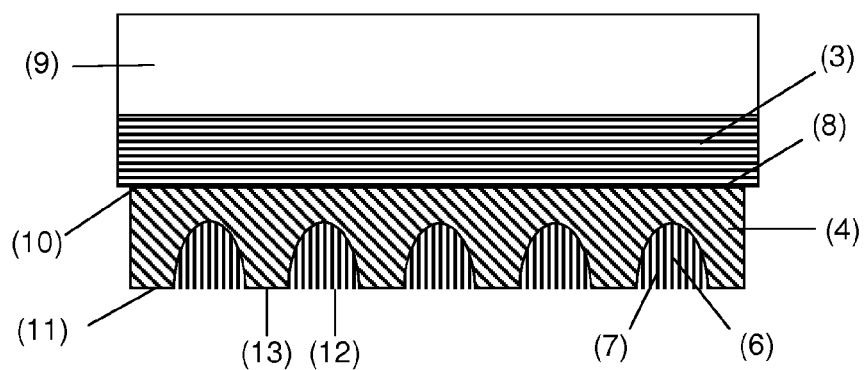
Figure 6:
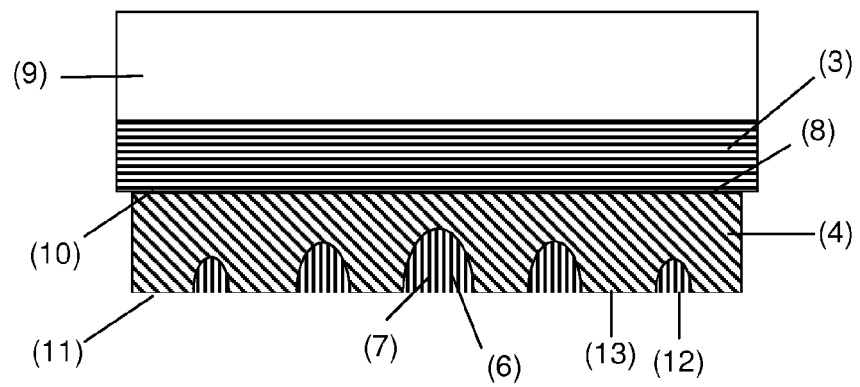
Figure 7:
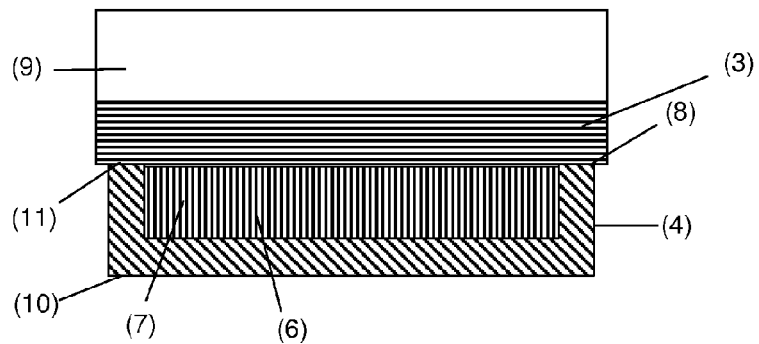
Figure 8:
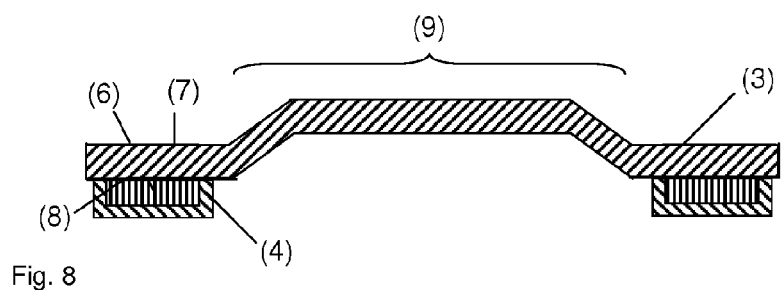
Figure 9:
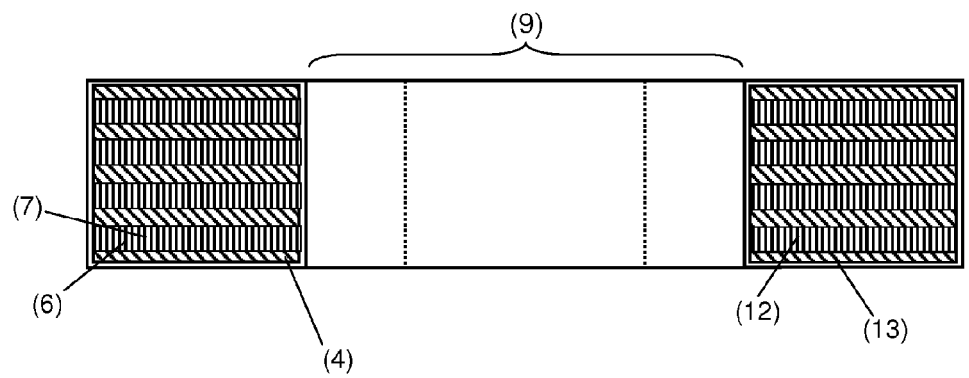
Figure 10:
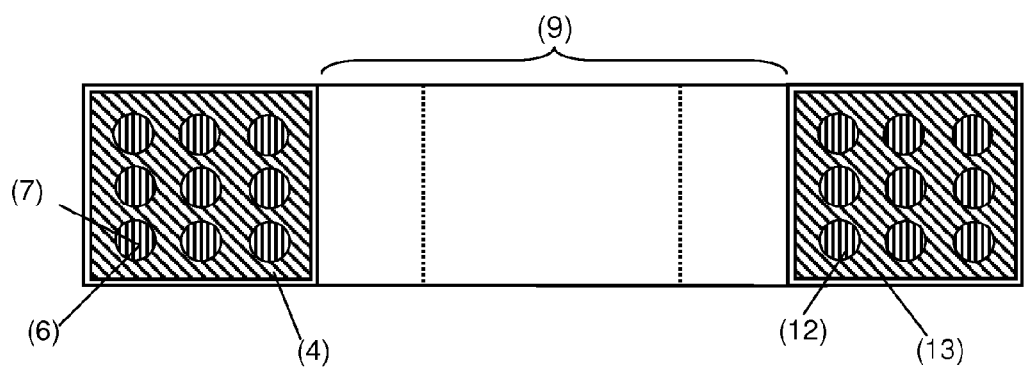
Figure 11:
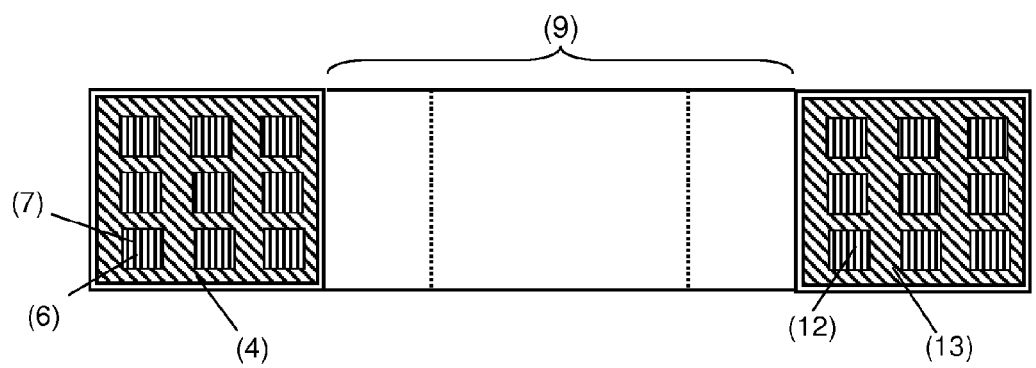
Figure 12:
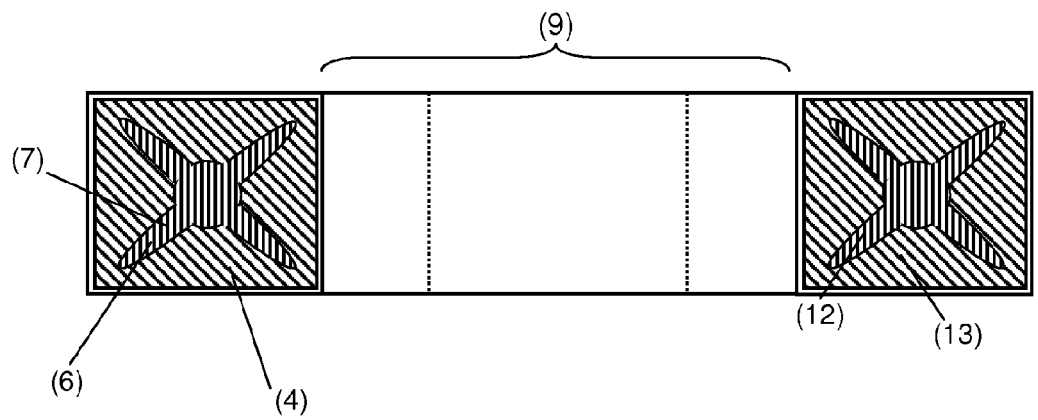
Figure 13:
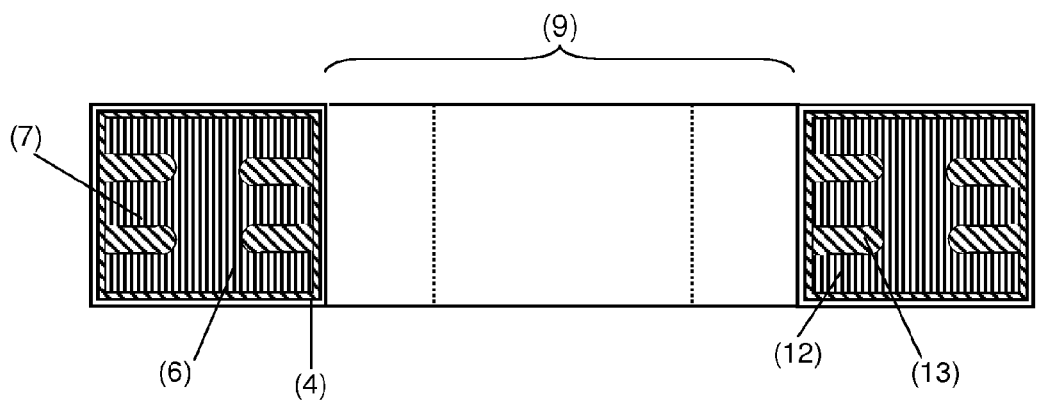
Figure 14:
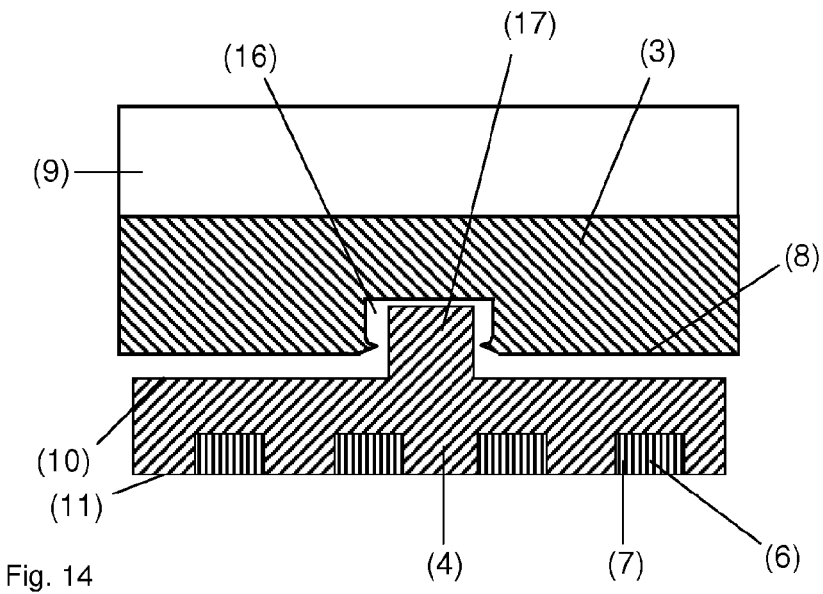
Figure 14A:
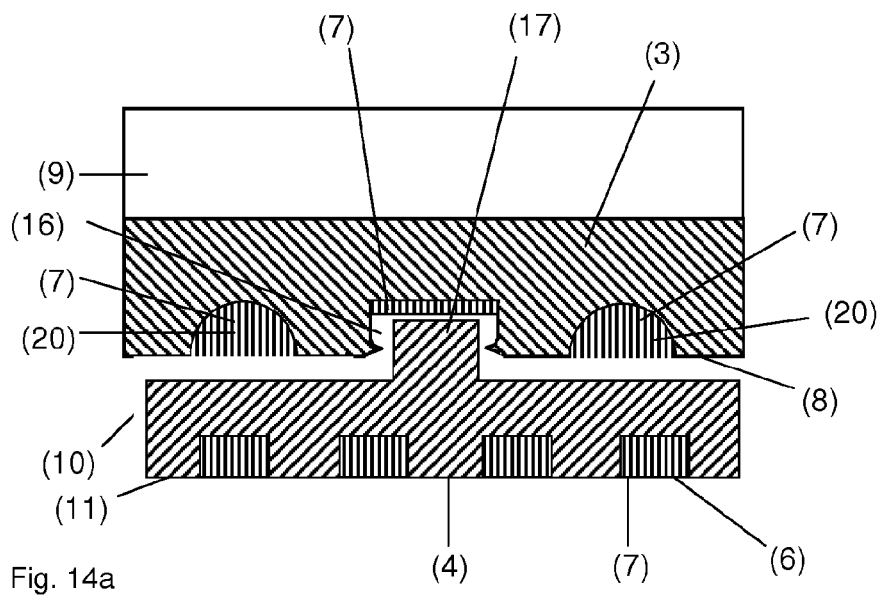
Figure 15:
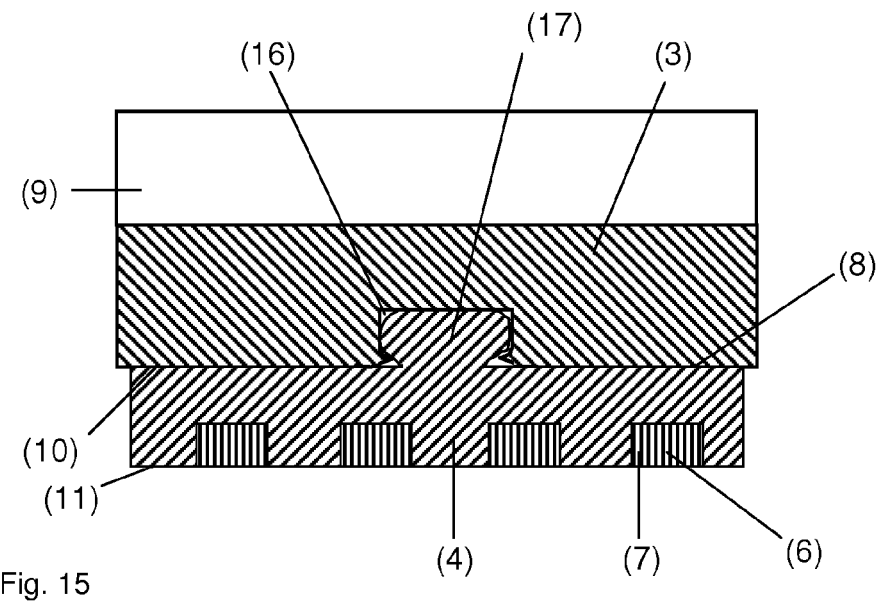
Figure 16:
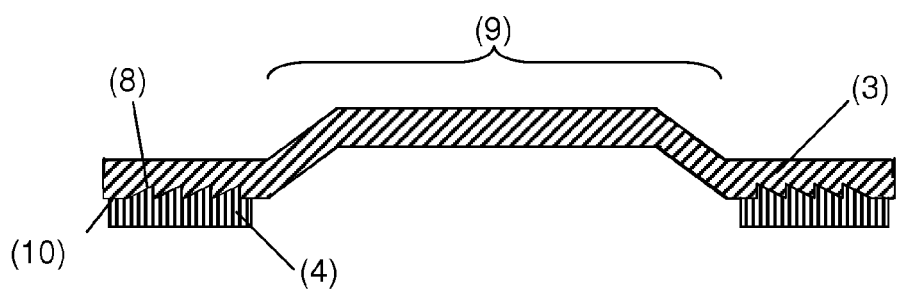
Figure 17:
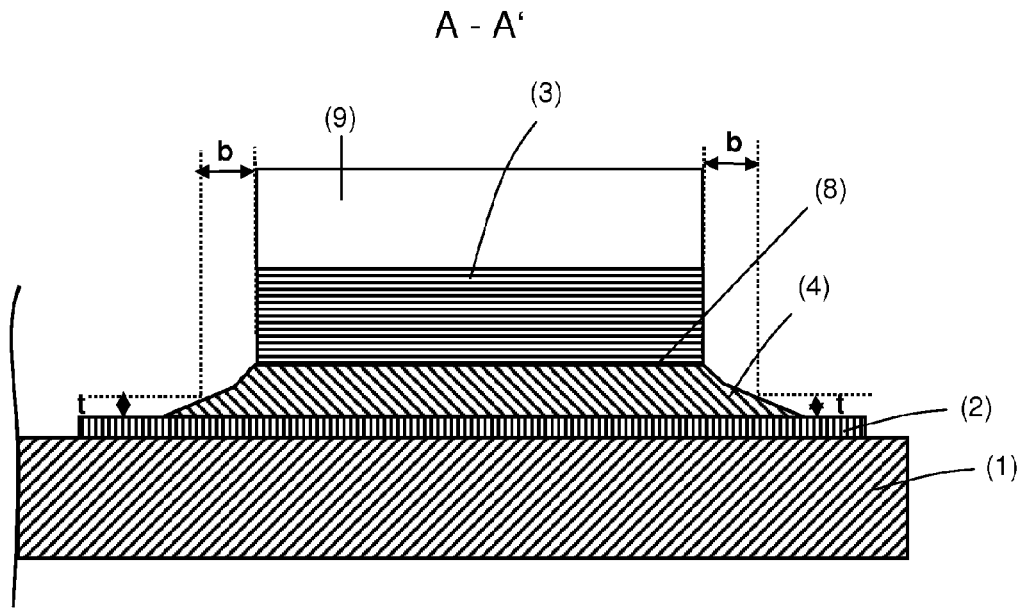
Figure 18:
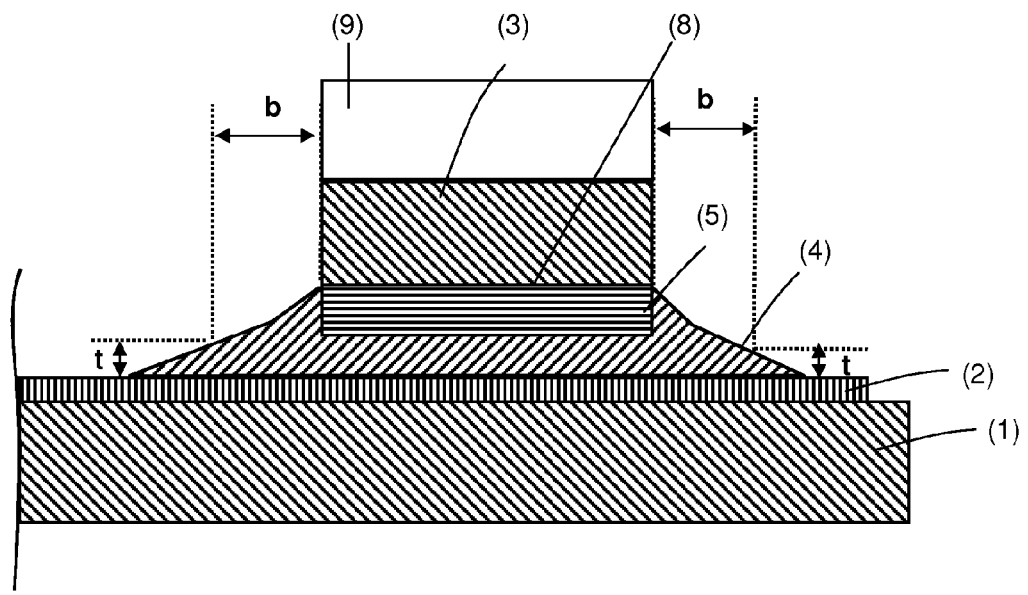
Figure 19:
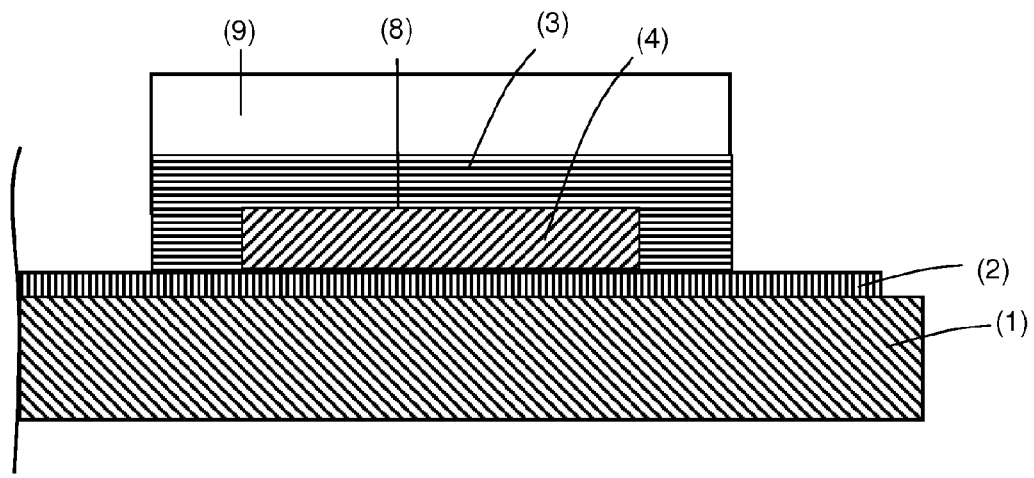
Figure 20:
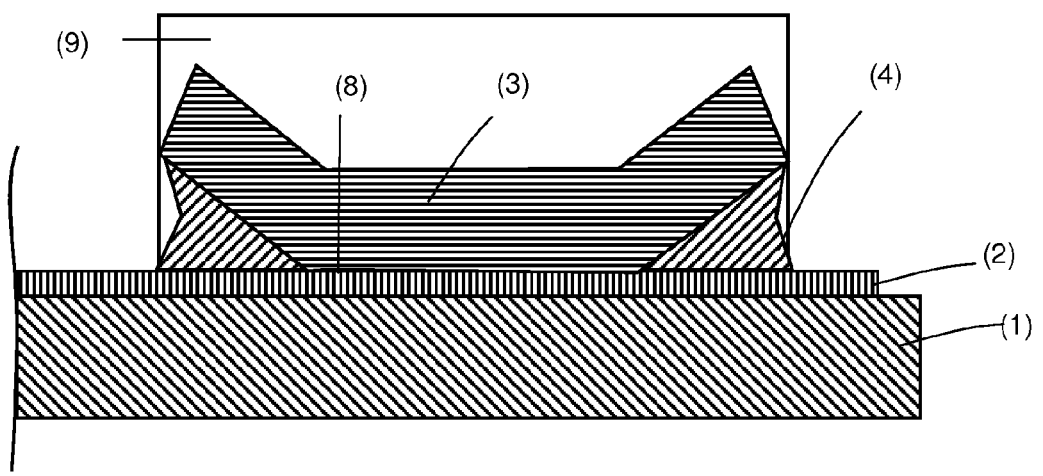
Figure 21:
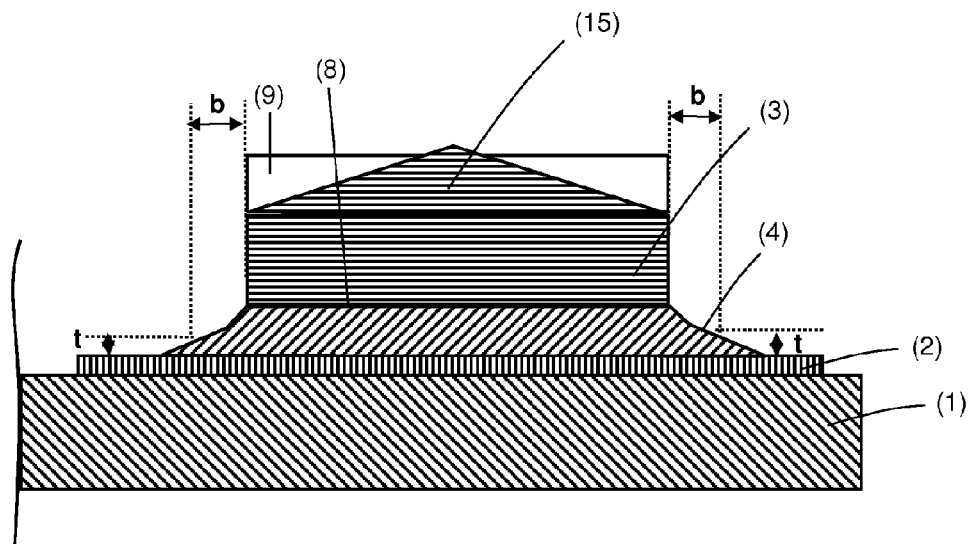
Figure 22:
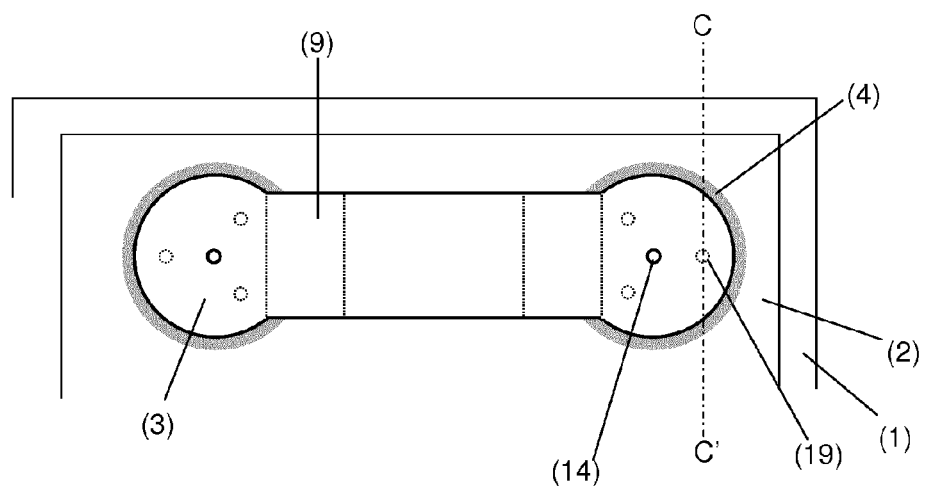
Figure 23:
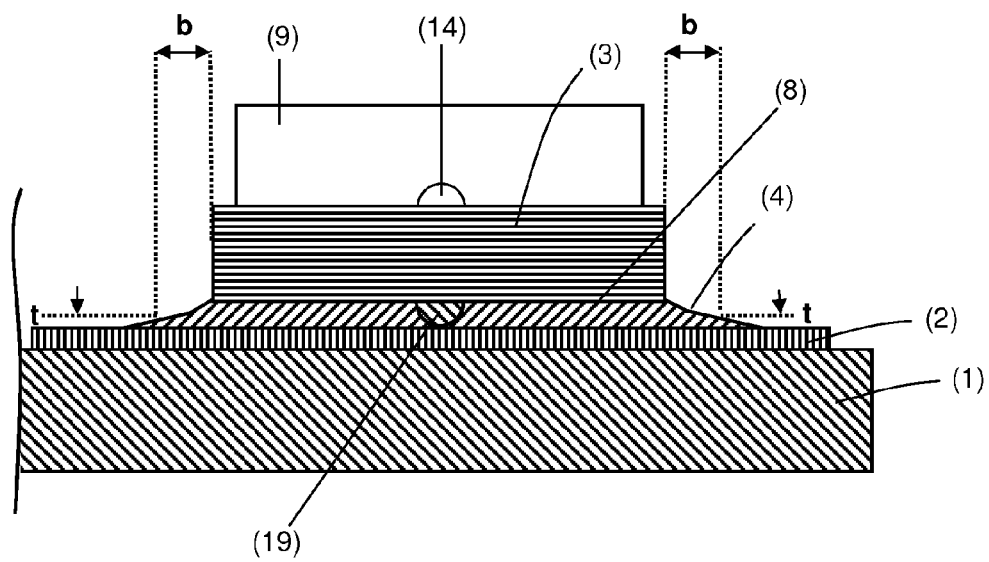
Figure 24:
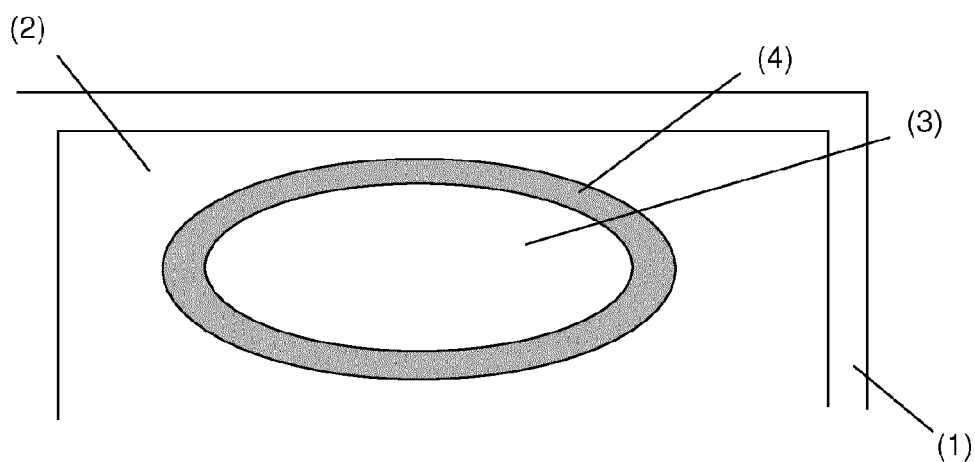
Figure 25:
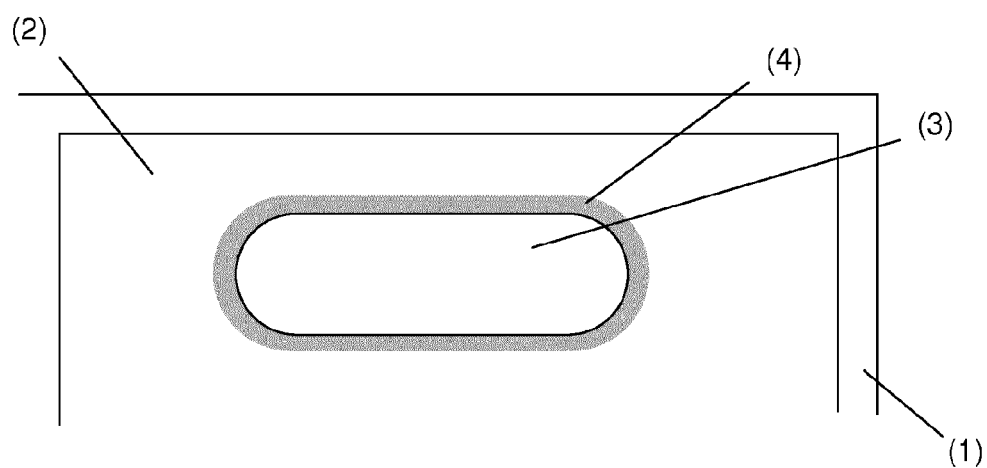
Figure 26:
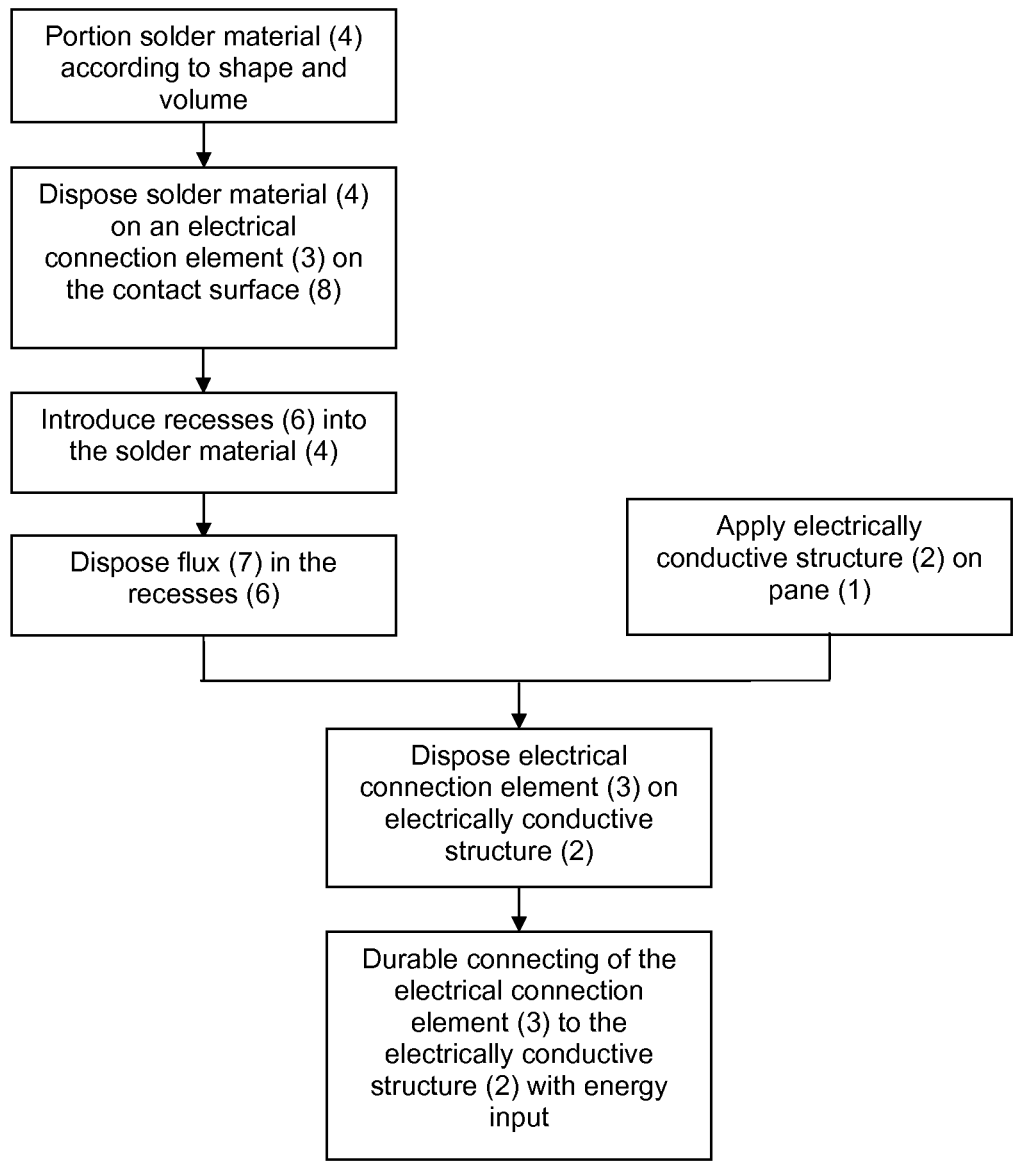
Figure 27:
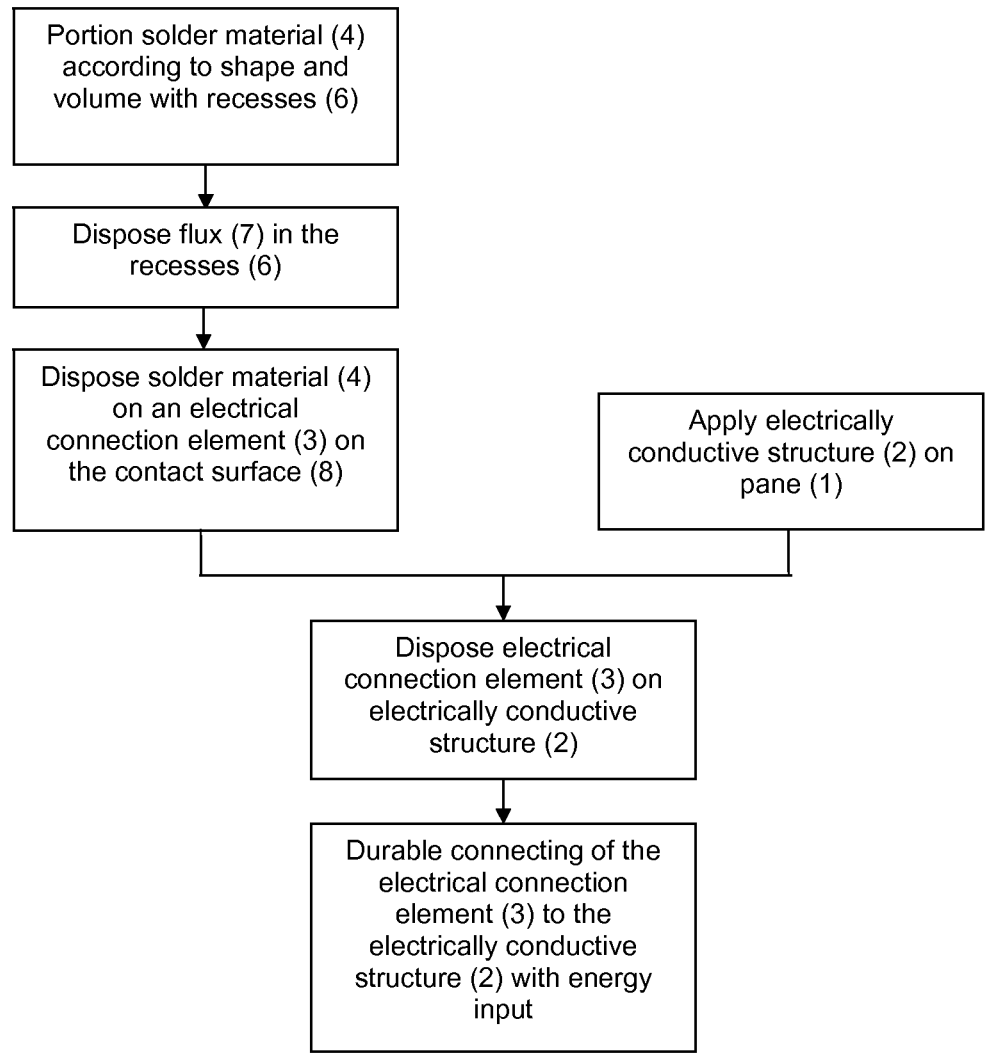

The invention is explained in detail with reference to drawings and exemplary embodiments. The drawings are a schematic representation and not true to scale. The drawings do not restrict the invention in any way. They depict:

FIG. 1 a perspective view of a first embodiment of the pane according to the invention with a connection element, FIG. 2 a cross-section A-A' through the connection element according to the invention with solder material and flux before soldering, consequently, without a pane, FIG. 3 a cross-section A-A' through an alternative embodiment of the connection element with solder material and flux before soldering, consequently, without a pane, FIG. 4 a cross-section A-A' through an alternative embodiment of the connection element with solder material and flux before soldering, consequently, without a pane, FIG. 4a a cross-section A-A' through an alternative embodiment of the connection element with solder material and flux before soldering, consequently, without a pane, FIG. 5 a cross-section A-A' through an alternative embodiment of the connection element with solder material and flux before soldering, consequently, without a pane, FIG. 6 a cross-section A-A' through an alternative embodiment of the connection element with solder material and flux before soldering, consequently, without a pane, FIG. 7 a cross-section A-A' through an alternative embodiment of the connection element with solder material and flux before soldering, consequently, without a pane, FIG. 8 a cross-section B-B' through the connection element with solder material and flux from FIG. 7 before soldering, FIG. 9 a plan view of the bottom of the connection element of FIG. 2, FIG. 10 a plan view of the bottom of an alternative embodiment of the connection element with solder material and flux before soldering, FIG. 11 a plan view of the bottom of an alternative embodiment of the connection element with solder material and flux before soldering, FIG. 12 a plan view of the bottom of an alternative embodiment of the connection element with solder material and flux before soldering, FIG. 13 a plan view of the bottom of an alternative embodiment of the connection element with solder material and flux before soldering, FIG. 14 a cross-section A-A' through an embodiment of the connection element according to the invention before connection to the solder material, without a pane, FIG. 14a a cross-section A-A' through an alternative embodiment of the connection element according to the invention before connection to the solder material, without a pane, FIG. 15 a cross-section A-A' according to FIG. 14 after connection to the solder material, without a pane, FIG. 16 a cross-section B-B' through an alternative embodiment of the connection element according to the invention with solder material, without a pane, FIG. 17 a cross-section A-A' through the pane of FIG. 1, FIG. 18 a cross-section A-A' through an alternative pane according to the invention with a connection element, FIG. 19 a cross-section A-A' through another alternative pane according to the invention with a connection element, FIG. 20 a cross-section A-A' through another alternative pane according to the invention with a connection element, FIG. 21 a cross-section A-A' through another alternative pane according to the invention with a connection element, FIG. 22 a plan view of an alternative embodiment of the pane according to the invention with a connection element, FIG. 23 a cross-section C-C' through the pane of FIG. 22, FIG. 24 a plan view of an alternative embodiment of the pane according to the invention with a connection element, FIG. 25 a plan view of an alternative embodiment of the pane according to the invention with a connection element, FIG. 26 a detailed flow diagram of an embodiment of the method according to the invention, FIG. 27 a detailed flow diagram of an alternative embodiment of the method according to the invention, FIG. 1 and FIG. 17 show, in each case, a detail of a heatable pane 1 according to the invention in the region of the electrical connection element 3. The pane 1 is a 3-mm-thick thermally prestressed single-pane safety glass made of soda lime glass. The pane 1 has a width of 150 cm and a height of 80 cm. An electrically conductive structure 2 in the form of a heating conductor structure 2 is printed on the pane 1. The electrically conductive structure 2 contains silver particles and glass frits. In the edge region of the pane 1, the electrically conductive structure 2 is widened to a width of 10 mm and forms a contact surface for the electrical connection element 3. In the edge region of the pane 1, there is also a covering screenprint (not shown).

The electrical connection element 3 is designed in the form of a bridge and has a width of 4 mm and a length of 24 mm. The electrical connection element 3 is made from steel of the material number 1.4509 in accordance with EN 10 088-2 (ThyssenKrupp Nirosta® 4509) with a coefficient of thermal expansion of $10.0 \times 10^{-6}/°$ C. The two contact surfaces 8 are rectangular with a width of 4 mm and a length of 6 mm and are connected to each other via a bridge 9. The bridge 9 consists of three flat segments. The surface facing the substrate 1 of each of the two segments of the bridge 9 directly adjacent a contact surface 8 encloses an angle of 40° with the surface of the substrate 1. The advantage resides in the action of the capillary effect between the electrically conductive structure 2 and the segments of the bridge 9 adjacent the contact surfaces 8. The capillary effect is a consequence of the small distance between the electrically conductive structure 2 and the segments of the bridge 9 adjacent the contact surfaces 8. The small distance results from the angle between the surface of the substrate 1 and the bottom of each flat segment of the bridge 9 directly adjacent a contact surface 8. The desired distance between the connection element and the electrically conductive structure is set according to the melting of the solder material. Excess solder material is sucked in a controlled manner by means of the capillary effect into the volume delimited by the bridge 9 and the electrically conductive structure 2. Thus, the solder material crossover on the outer edges of the connection element is reduced and, with it, the maximum outflow width. A reduction of the mechanical stresses in the pane is thus achieved.

In the region of the contact surfaces 8 between the electrical connection element 3 and the electrically conductive structure 2, solder material 4 is applied, which effects a durable electrical and mechanical connection between the electrical connection element 3 and the electrically conductive structure 2. The solder material 4 contains 57 wt.-% bismuth, 42 wt.-% tin, and 1 wt.-% silver. The solder material 4 is arranged through a predefined volume and shape completely between the electrical connection element 3 and the electrically conductive structure 2. The solder material 4 has a thickness of 250 µm.

FIG. 2 depicts a detail of the connection element 3 according to the invention of FIG. 1 before the soldering process. The solder material 4 is disposed as platelets with a width of 3 mm, a length of 5.5 mm, and a thickness of 0.38 mm on each contact surface 8. The solder material 4 is connected to the contact surface 8 via the first contact side 10. Four recesses 6 with a width of 0.4 mm are introduced into the solder material via the portions 12 of the second contact sides 11. The portions 12 run parallel to each other from one edge of the contact side 11 to the opposite edge. The portions 13 of the contact side 11, via which no recesses 6 are introduced into the solder material 4, are flat in shape. In the cross-section perpendicular to the contact sides 10 and 11, the recesses 6 have a rectangular shape. The recesses 6 have a depth of 0.2 mm. The flux 7 is disposed in the recesses 6. The flux 7 preferably contains colophonium and other additives.

FIG. 3 depicts an alternative embodiment of the connection element 3 according to the invention with the solder material 4 and the flux 7 before the soldering process. The solder material 4 and the recesses 6 are shaped in accordance with FIG. 2. The solder material 4 is disposed on the contact surfaces 8 via the second contact side 11, via which the recesses 6 are introduced into the solder material 4. This is particularly advantageous with regard to protection of the flux 7 against oxidation through atmospheric oxygen.

FIG. 4 depicts another alternative embodiment of the connection element 3 according to the invention with the solder material 4 and the flux 7 before the soldering process. The solder material 4 is connected to the contact surface 8 via the first contact side 10. Three recesses 6 with a depth of 0.2 mm are introduced into the solder material 4 via the portions 12 of the second contact side 11. The portions 12 run parallel to each other from one edge of the contact side 11 to the opposite edge. In the cross-section perpendicular to the contact sides 10 and 11, the recesses 6 have the shape of a symmetrical trapezoid. The long base of the trapezoid is disposed on the contact side 11 and has a length of 0.45 mm. The short base of the trapezoid has a length of 0.3 mm. The cross-sectional area of the recesses 6 parallel to the contact side 11 becomes smaller with an increased distance from the contact side 11. The advantage resides in greater stability of the solder material 4 in the edge regions. The flux 7 is disposed in the recesses 6.

FIG. 4a depicts another alternative embodiment of the connection element 3 according to the invention with the solder material 4 and the flux 7 before the soldering process. The solder material 4 is connected to the contact surface 8 via the first contact side 10. Three recesses 6 with a depth of 0.2 mm are introduced into the solder material 4 via the portions 12 of the second contact side 11. The portions 12 run parallel to each other from one edge of the contact side 11 to the opposite edge. In the cross-section perpendicular to the contact sides 10 and 11, the recesses 6 have the shape of a symmetrical trapezoid. The short base of the trapezoid is disposed on the contact side 11 and has a length of 0.3 mm. The long base of the trapezoid has a length of 0.45 mm. The cross-sectional area of the recesses 6 parallel to the contact side 11 becomes larger with an increased distance from the contact side 11. This advantageously prevents the flux 7 from falling out of the recesses 6.

FIG. 5 depicts another alternative embodiment of the connection element 3 according to the invention with the solder material 4 and the flux 7 before the soldering process. The solder material 4 is connected to the contact surface 8 via the first contact side 10. Five recesses 6 with a depth of 0.25 mm and a width of 0.2 mm are introduced into the solder material 4 via the portions 12 of the second contact side 11. The portions 12 run parallel to each other from one edge of the contact side 11 to the opposite edge. In the cross-section perpendicular to the contact sides 10 and 11, each recess 6 has the shape of an elliptical segment. The flux 7 is disposed in the recesses 6.

FIG. 6 depicts an alternative embodiment of the connection element 3 according to the invention with the solder material 4 and the flux 7 before the soldering process. The solder material 4 is connected to the contact surface 8 via the first contact side 10. Five recesses 6 are introduced into the solder material 4 via the portions 12 of the second contact side 11. The portions 12 run parallel to each other from one edge of the contact side 11 to the opposite edge. In the cross-section perpendicular to the contact sides 10 and 11, each recess 6 has the shape of an elliptical segment. The two recesses 6 with the shortest distance from an outside edge of the solder material 4 have a depth of 0.05 mm; the center recess has a depth of 0.25 mm; and the recesses situated between them have a depth of 0.15 mm. the advantage of the different depths of the recesses 6 resides in greater stability of the solder material 4 in the edge regions. The flux 7 is disposed in the recesses 6.

FIG. 7 and FIG. 8 depict, in each case, a detail of an alternative embodiment of the connection element 3 according to the invention with solder material 4 and flux 7 before the soldering process. One recess 6 with a depth of 0.2 mm is introduced into the solder material 4 via a portion 12 of the second contact side 11. The portion 12 is rectangular with a length of 4.5 mm and a width of 2 mm. The solder material 4 is connected to the contact surface 8 of the connection element 3 via the contact side 11.

FIG. 9 depicts a detail of the connection element 3 according to the invention from FIG. 2 with solder material 4 and flux 7 before the soldering process. The portions 12 of the second contact side 11, via which the recesses 6 are introduced into the solder material 4, run parallel to each other from one edge of the contact side 11 to the opposite edge. The width of each recess 6 is 0.4 mm.

FIG. 10 depicts an alternative embodiment of the connection element 3 according to the invention with solder material 4 and flux 7 before the soldering process. The solder material 4 is connected with the contact surface 8 via the first contact side 10. Nine recesses 6 with a depth of 0.2 mm are introduced into the solder material 4 via the portions 12 of the second contact side 11. The portions 12 are completely surrounded in the plane of the contact side 11 by the portion 13, via which no recesses are introduced. Each portion 12 is shaped as a circle with a radius of 0.25 mm. The flux 7 is disposed in the recesses 6.

FIG. 11 depicts another alternative embodiment of the connection element 3 according to the invention with solder material 4 and flux 7 before the soldering process. The solder material 4 is connected to the contact surface 8 via the first contact side 10. Nine recesses 6 with a depth of 0.2 mm are introduced into the solder material 4 via the portions 12 of the second contact side 11. The portions 12 are completely surrounded in the plane of the contact side 11 by the portion 13, via which no recesses are introduced. Each portion 12 is shaped as a rectangle with a length and width of 0.5 mm. The flux 7 is disposed in the recesses 6.

FIG. 12 depicts another alternative embodiment of the connection element 3 according to the invention with solder material 4 and flux 7 before the soldering process. One recess 6 is introduced into the solder material 4 via the portion 12 of the second contact side 11. The portion 12 is completely surrounded in the plane of the contact side 11 by the portion 13, via which no recesses are introduced. The portion 12 is shaped as a circle with a diameter of 1 mm, with four bulges in the shape of elliptical segments with a length of 2 mm that point to the corners of the contact side 11 disposed on the circle. By means of the shape of the recess 6 with the flux 7, an advantageous distribution of the soldering heat in the soldering material 4 is achieved.

FIG. 13 depicts another alternative embodiment of the connection element 3 according to the invention with solder material 4 and flux 7 before the soldering process. By means of the bulges of the portions 12 that point to the edges of contact surface 11, an advantageous distribution of the soldering heat in the soldering material 4 is achieved.

FIG. 14 depicts a cross-section A-A' through the connection element 3 and the solder material 4 before connecting in an embodiment of the method according to the invention. An indentation 16 with a depth of 0.3 mm is introduced into the connection element 3 in the region of the contact surface 8. The rectangular cross-sectional area of the indentation 16 parallel to the contact surface of is enlarged in a portion of the indentation with an increasing distance from the contact surface 8 from 0.8 mm² to 1 mm². A bulge 17 is disposed on the first contact side 10 of the solder material 4. The bulge 17 is shaped as a rectangular solid with a length and width of 0.8 mm and a height of 0.45 mm. Before the pressing of the solder material 4 onto the connection element 3, the bulge 17 is positioned in the indentation 16.

FIG. 14a depicts a cross-section A-A' through the connection element 3 and the solder material 4 before connecting in an alternative embodiment of the method according to the invention. The indentation 16 of the connection element 3 and the bulge 17 of the solder material 4 are shaped as in FIG. 14. A flux 7 is disposed in the indentation 16. Two additional indentations 20 with a depth of 0.3 mm are introduced into the connection element 3 in the region of the contact surface 8. A flux 7 is likewise disposed in the indentations 20. The advantage resides in the positioning of the flux 7 in the contact region between solder material 4 and connection element 3, by means of which the flux 7 is protected against falling out and oxidation through atmospheric oxygen.

FIG. 15 depicts a cross-section through the connection element 3 and the solder material 4 of FIG. 14 after connecting by pressing. The bulge 17 has changed shape compared to FIG. 14. The maximum cross-sectional area of the bulge 17 parallel to the contact surface 8 is larger than the minimum cross sectional area of the indentation 16. Thus, the connection of the solder material 4 to the connection element 3 is durably stable.

FIG. 16 depicts a cross-section B-B' through the connection element 3 and the solder material 4 after connecting by pressing in an alternative embodiment of the method according to the invention. A portion of the contact surface 8 has a sawtooth profile. The cross-section depicts one row of the sawtooth profile. An additional row with a sawtooth profile running in the opposite direction is situated In front of and behind the cross-section depicted, respectively. By pressing the solder material 4 onto the contact surface 8, the solder material 4 is tilted over the contact side 10 in the sawtooth profile. This makes the connection of the solder material with the connection element durably stable.

FIG. 17 depicts a cross-section A-A' through the pane according to invention of FIG. 1.

FIG. 18 depicts, in continuation of the exemplary embodiment of FIGS. 1 and 17, an alternative embodiment of the pane according to the invention. The electrical connection element 3 is provided on the surface facing the solder material 4 with a silver-containing coating 5. This prevents spreading of the solder material out beyond the coating 5 and limits the outflow width b. In another embodiment, an adhesion-promoting layer made, for example, of nickel and/or copper, can be situated between the connection element 3 and the silver-containing layer 5. The outflow width b of the solder material 4 is less than 1 mm.

FIG. 19 depicts, in continuation of the exemplary embodiment of FIGS. 1 and 17, another alternative embodiment of the pane according to the invention. The electrical connection element 3 contains, on the surface facing the solder material 4, a recess with a depth of 250 µm that forms a solder reservoir for the solder material 4. It is possible to completely prevent outflow of the solder material 4 from the intermediate space.

FIG. 20 depicts, in continuation of the exemplary embodiment of FIGS. 1 and 17, another alternative embodiment of the pane according to the invention. The electrical connection element 3 is bent upward on the edge regions. The height of the upward bend of the edge region of the glass pane 1 is a maximum of 400 µm. This forms a space for the solder material 4. The predefined solder material 4 forms a concave meniscus between the electrical connection element 3 and the electrically conductive structure 2. It is possible to completely prevent outflow of solder material 4 from the intermediate space. The outflow width b, at roughly 0, is less than zero, largely because of the meniscus formed.

FIG. 21 depicts another alternative embodiment of the pane according to the invention with a connection element 3 in the form of a bridge. The connection element 3 contains an iron-containing alloy with a coefficient of thermal expansion of 8×10⁻⁶/° C. The material thickness is 2 mm. In the region of the contact surfaces 8 of the connection element 3, hat-shaped compensation members 15 are applied with chromium-containing steel of the material number 1.4509 in accordance with EN 10 088-2 (ThyssenKrupp Nirosta® 4509). The maximum layer thickness of the hat-shaped compensation members 15 is 4 mm. By means of the compensation members, it is possible to adapt the coefficients of thermal expansion of the connection element 3 to the requirements of the pane 1 and of the solder material 4. The hat-shaped compensation members 15 result in improved heat flow during the production of the solder connection 4. The heating occurs primarily in the center of the contact surfaces 8. It is possible to further reduce the outflow width b of the solder material 4. Because of the low outflow width b of <1 mm and the adapted coefficient of expansion, it is possible to further reduce the thermal stresses in the pane 1.

FIG. 22 and FIG. 23 depict, in each case, a detail of another alternative embodiment of the pane according to the invention with a connection element 3 in the shape of a bridge made of steel of the material number 1.4509 in accordance with EN 10 088-2 (ThyssenKrupp Nirosta® 4509). Each contact surface 8 has the shape of a circular segment with a radius of 3 mm and a central angle of 276°.

During the soldering process, heat distribution spreads starting from the soldering points that are disposed on the surfaces of the connection element opposite the contact surfaces. The isotherms can, for the case of two spot heat sources, be depicted, for the sake of simplicity, as concentric circles around the soldering points. The shape of the contact surfaces 8 approximates the shape of the heat distribution around the soldering points during the soldering process. Consequently, only slight or no temperature differences arise along the edges of the contact surfaces during the soldering process. This results in uniform melting of the solder material in the entire region of the contact surfaces between the connection element and the electrically conductive structure. This is particularly advantageous with regard to the adhesion of the connection element, the shortening of the duration of the soldering process, and the avoidance of mechanical stresses in the pane.

Two contact bumps 14 are disposed on the surface of the connection element 3 facing away from the substrate 1. The contact bumps 14 contain the same alloy as the connection element 3. The centers of the contact bumps 14 are disposed vertical to the surface of the substrate above the circle centers of the two contact surfaces 8. The contact bumps 14 are shaped as hemispheres and have a height of $2.5 \times 10^{-4}$ m and a width of $5 \times 10^{-4}$ m. In alternative embodiments of the invention, each contact bump can, for example, be shaped as a segment of a rotational ellipsoid or as a rectangular solid with a convexly curved surface turned away from the substrate. The contact bumps can preferably have a height of 0.1 mm to 2 mm, particularly preferably of 0.2 mm to 1 mm. The length and width of the contact bumps can preferably be between 0.1 and 5 mm, particularly preferably between 0.4 mm and 3 mm. The contact bumps can be designed as embossings. During the soldering process, the soldering electrodes are brought into contact with the contact bumps 14. Preferably, soldering electrodes are used whose contact side is flat. The contact region between the electrode surface and the contact bump 14 forms the soldering point. The position of the soldering point is thus determined preferably by the point on the convex surface of the contact bump that has the greatest vertical distance from the surface of the substrate. The position of the soldering point is independent of the position of the solder electrode on the connection element. That is particularly advantageous with regard to a reproducible, uniform heat distribution during the soldering process.

Three spacers 19 are disposed on each of the contact surfaces 8. The spacers 19 are shaped as hemispheres and have a height of $2.5 \times 10^{-4}$ m and a width of $5 \times 10^{-4}$ m. The spacers 19 contain the same alloy as the connection element 3. In alternative embodiments of the invention, the spacers can be shaped, for example, as a cube, as a pyramid, or as a segment of a rotational ellipsoid. The spacers can preferably have a width of $0.5 \times 10^{-4}$ m to $10 \times 10^{-4}$ m and a height of $0.5 \times 10^{-4}$ m to $5 \times 10^{-4}$ m, particularly preferably of $1 \times 10^{-4}$ m to $3 \times 10^{-4}$ m. The spacers can be designed as embossings. By means of the spacers, the formation of a uniform layer of solder material is favored. That is particularly advantageous with regard to the adhesion of the connection element The contact bumps 14 and spacers 19 can, in an advantageous embodiment, be formed in one piece with the connection element 3. The contact bumps 14 and the spacers 19 can, for example, be formed by reshaping a connection element 3 with a flat surface in the initial state on the surface, for example, by embossing or deep drawing. In the process, a corresponding indentation can be created on the surface of the connection element 3 opposite the contact bump 14 or the spacer 19.

By means of the contact bumps 14 and the spacers 19, a homogeneous, uniformly thick, and uniformly fuzed layer of the solder material 4 is obtained. Thus, mechanical stresses between the connection element 3 and substrate 1 can be reduced. This is particularly advantageous with the use of leadfree solder materials that can compensate mechanical stresses less well due to their lower ductility compared to lead-containing solder materials.

FIG. 24 depicts a plan view of another alternative embodiment of the pane 1 according to the invention in the region of the electrical connection element 3. The electrical connection element 3 is designed with an elliptical base surface. The length of the major axis is 12 mm; the length of the minor axis, 5 mm. The material thickness of the connection element 3 is 0.8 mm. The connection element 3 is connected over its entire surface to a portion of the electrically conductive structure 2 via a contact surface 8.

FIG. 25 depicts a plan view of another alternative embodiment of the pane 1 according to the invention in the region of the electrical connection element 3. The connection element 3 is designed as a rectangle, with the two short sides of the rectangle designed as semicircles. The connection element 3 has a width of 5 mm and a length of 14 mm.

FIG. 26 depicts in detail an exemplary embodiment of the method according to the invention for producing a pane 1 with an electrical connection element 3. As the first step, the solder material 4 is portioned according to shape and volume. Here, the solder material 4 is rolled to form a strip with a width of 3 mm and a thickness of 0.38 mm and flat surfaces. Platelets of the solder material 4 with a length of 5.5 mm are cut from the strip. The portioned solder material 4 is then disposed via the first contact side 10 on the contact surface 8 of the electrical connection element 3. The recesses 6 are then embossed into the solder material 4 via the contact side 11 of the solder material 4 turned away from the connection element 3. The flux 7 is applied on the contact side 11 and, in the process, disposed at least in the recesses 6. The electrical connection element 3 is disposed with the solder material 4 and the flux 7 on the electrically conductive structure 2. A durable connection of the electrical connection element 3 to the electrically conductive structure 2 and, thus, to the pane 1 occurs under input of energy.

FIG. 27 depicts in detail an alternative exemplary embodiment of the method according to the invention for producing a pane 1 with an electrical connection element 3. As the first step, the solder material 4 is portioned according to shape and volume with the recesses 6. Here, the solder material 4 is rolled to form a strip with a width of 3 mm and a thickness of 0.38 mm, with the surface of one roller designed structured such that in one surface of the strip, recesses are introduced on the solder material 4. Platelets of the solder material 4 with a length of 5.5 mm are cut from the strip. The flux 7 is then applied on the contact side 11, via which the recesses 6 are introduced into the solder material 4. The portioned solder material 4 with the flux 7 is then disposed on the contact surface 8 of the electrical connection element 3 via the contact site 10. Alternatively, the solder material 4 can be disposed on the contact surface 8 via the contact side 11. The electrical connection element 3 is disposed with the solder material 4 and the flux 7 on the electrically conductive structure 2. A durable connection of the electrical connection element 3 to the electrically conductive structure 2 and, thus, to the pane 1 occurs under input of energy.

In an alternative embodiment, the solder material 4 is rolled to form a strip with flat surfaces, cut into platelets, and the recesses 6 are then embossed into the contact side 11 of the platelet.

In another alternative embodiment, the solder material 4 is rolled to form a strip with recesses on one surface. The flux 7 is disposed at least in the recesses and, thereafter, platelets of the solder material 4 with the flux 7 are cut.

EXAMPLE

Test specimens were produced using the method according to the invention of FIG. 26 with a pane 1 (thickness 3 mm, width 150 cm, and height 80 cm) with an electrically conductive structure 2 in the form of a heating conductor structure, an electrical connection element 3, a silver layer 5 on the contact surfaces 8 of the connection element 3, the solder material 4 with the recesses 6, and the flux 7. The material thickness of the connection element 3 was 0.8 mm. The connection element 3 contained steel of the material number 1.4509 in accordance with EN 10 088-2 (ThyssenKrupp Nirosta® 4509). The electrical connection element 3, the solder material 4 before the soldering process, and the recesses 6 were formed in accordance with FIGS. 2 and 9. The flux was Stannol® 400-25. The flux 7 contained colophonium and other additives. The connection element 3 was applied with the solder material 4 and the flux 7 on the electrically conductive structure 2. The connection element 3 was soldered onto the electrically conductive structure 2 at a temperature of 200° C. and a processing time of 2 seconds. Outflow of the solder material 4 from the intermediate space between the electrical connection element 3 and the electrically conductive structure 2, which exceeded a layer thickness t of 50 μm, was observed only to a maximum outflow width of b=0.4 mm. The dimensions and compositions of the electrical connection element 3, the silver layer 5 on the contact surfaces 8 of the connection element 3, and the solder material 4 with recesses 6 and flux 7 are found in Table 1. No critical mechanical stresses were observed in the pane 1 due to the arrangement of the solder material 4, predefined by the connection element 3 and the electrically conductive structure 2. The connection of the pane 1 to the electrical connection element 3 via the electrically conductive structure 2 was durably stable after soldering with the solder material 4 and the flux 7 in all specimens.

With all specimens, it was possible to observe, with a temperature difference from +80° C. to −30° C., that no glass substrate 1 broke or showed damage. It was possible to demonstrate that, shortly after soldering, these panes 1 with the soldered connection element 3 were stable against a sudden temperature drop.

TABLE 1

| Components | Material | Example |
|---|---|---|
| Connection element 3 | Steel of material no. 1.4509 in accordance with EN 10 088-2 with the composition: | |
| | Iron (wt.-%) | 78.87 |
| | Carbon (wt.-%) | 0.03 |
| | Chromium (wt.-%) | 18.5 |
| | Titanium (wt.-%) | 0.6 |
| | Niobium (wt.-%) | 1 |
| | Manganese (wt.-%) | 1 |
| | CTE (coefficient of thermal expansion) ($10^{-6}$/° C. for 0° C.-100° C.) | 10 |
| | Difference between CTE of the connection element and substrate ($10^{-6}$/° C. for 0° C.-100° C.) | 1.7 |
| | Thickness of the connection element (m) | $8.0 \times 10^{-4}$ |
| Wetting layer 5 | Silver (wt.-%) | 100 |
| | Thickness of the layer (m) | $7.0 \times 10^{-6}$ |
| Solder material 4 | Iron (wt.-%) | 42 |
| | Bismuth (wt.-%) | 57 |
| | Silver (wt.-%) | 1 |
| | Mass (g) | $118 \times 10^{-3}$ |
| Recesses 6 | Depth (m) | $2 \times 10^{-4}$ |
| Flux 7 | Stannol ® 400-25 | |
| | Mass (g) | $2 \times 10^{-3}$ |
| Glass substrate 1 (Soda lime glass) | CTE ($10^{-6}$/° C. for 0° C.-320° C.) | 8.3 |

COMPARATIVE EXAMPLE

The comparative example was carried out the same as the example. The difference resided in the configuration of the solder material 4 before the soldering process. No recesses 6 were introduced into the solder material 4. Thus, the flux was not protected against loss by abrasion during transport of the connection element.

The comparison between the specimens from the example and the comparative specimens demonstrated that with 80% of the specimens, the stable connection between the connection element 3 and the electrically conductive structure 2 was improved.

Panes produced with the method according to the invention had better stability of the connection between an electrical connection element 3 and an electrically conductive structure 2.

This result was unexpected and surprising for the person skilled in the art.

LIST OF REFERENCE CHARACTERS (1) Pane
(2) Electrically conductive structure
(3) Electrical connection element
(4) Solder material
(5) Wetting layer
(6) Recess in the solder material 4
(7) Flux
(8) Contact surface of the connection element 3
(9) Bridge between two contact surfaces 8
(10) First contact side of the solder material 4
(11) Second contact side of the solder material 4
(12) Portion of the contact side 11
(13) Portion of the contact side 11
(14) Contact bump
(15) Compensation member
(16) Indentation of the connection element 3
(17) Bulge of the solder material 4
(19) Spacer

(20) Indentation of the connection element 3
b Maximum outflow width of the solder material
t Limiting thickness of the solder material
A-A' Section line
B-B' Section line
C-C' Section line

The invention claimed is:

1. An electrical connection element with at least one contact surface, comprising:
   solder material disposed on a contact surface;
   at least one recess disposed in the solder material; and
   a flux disposed at least in the at least one recess,
       wherein the solder material is disposed on the contact surface of the connection element via a contact side that has each recess containing the flux, and
       wherein the connection element is disposed via the solder material on a portion of an electrically conductive structure on a substrate.

2. The connection element according to claim 1, wherein the connection element contains at least an iron-nickel alloy, an iron-nickel-cobalt alloy, or an iron-chromium alloy.

3. The connection element according to claim 2, wherein the connection element contains at least 50 wt.-% to 75 wt.-% iron, 25 wt.-% to 50 wt.-% nickel, 0 wt.-% to 20 wt.-% cobalt, 0 wt.-% to 1.5 wt.-% magnesium, 0 wt.-% to 1 wt.-% silicon, 0 wt.-% to 1 wt.-% carbon, or 0 wt.-% to 1 wt.-% manganese.

4. The connection element according to claim 2, wherein the connection element contains at least 50 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, or 0 wt.-% to 1 wt.-% titanium.

5. The connection element according to claim 1, wherein the solder material contains tin and a) bismuth, b) indium, c) zinc, d) copper, e) silver, or compositions of metals a)-e),
   the proportion of tin in the solder composition is preferably 3 wt.-% to 99.5 wt.-%, and
   the proportion of a) bismuth, b) indium, c) zinc, d) copper, e) silver, or compositions of metals a)-e) is preferably 0.5 wt.-% to 97 wt.-%.

6. The connection element according to claim 1, wherein the connection element is coated with nickel, tin, copper, and/or silver.

7. The connection element according to claim 6, wherein the connection element is coated with 0.1 µm to 0.3 µm nickel and/or 3 µm to 20 µm silver.

8. The connection element according to claim 1, wherein a proportion of flux in a totality of solder material and flux is from 0.1 wt.-% to 5 wt.-%.

9. The connection element according to claim 8, wherein the proportion of flux in the totality of solder material and flux is from 0.3 wt.-% to 4 wt.-%, preferably from 0.5 wt.-% to 3 wt.-%.

10. The connection element according to claim 1, wherein the at least one recess is partially or completely filled with the flux.

11. The connection element according to claim 1, wherein the flux is disposed in at least one indentation in a region of the contact surface of the connection element.

12. A method, comprising:
    using the connection element according to claim 1 for contacting electrically conductive structures, preferably heating conductors and/or antenna conductors, on a pane in means of transportation for travel on land, in the air, or on water, in particular in motor vehicles, in buildings, in functional and/or decorative individual pieces.

13. A method of producing a pane with at least one electrical connection element, comprising:
    applying a solder material to at least one contact surface of the connection element, the solder material having at least one recess with a flux;
    disposing the connection element over the solder material on a portion of an electrically conductive structure on a substrate; and
    connecting the connection element to the electrically conductive structure by means of the solder material under input of heat,
        wherein in applying the solder material is first formed with at least one recess, the flux is then disposed at least in the at least one recess, and the solder material is then disposed on the contact surface of the connection element via a contact side that has each recess containing the flux.

14. The method according to claim 13, wherein a portion of a contact side, via which a recess is introduced into the solder material, is shaped a) as a rectangle, b) as an oval, c) as an ellipse, d) as a circle, or combinations of shapes a)-d).

15. The method according to claim 13, wherein the flux is applied as a solution on the solder material, and the solution of the flux contains at least 50 wt.-% to 95 wt.-% solvent, 0 wt.-% to 30 wt.-% colophonium, 0 wt.-% to 5 wt.-% dicarboxylic acids, 0 wt.-% to 8 wt.-% terpenes, and 0 wt.-% to 7 wt.-% solvent naphtha.

16. The method according to claim 15, wherein the 50 wt.-% to 95 wt.-% solvent is alcohol, preferably propan-2-ol or ethanol.

17. The method according to claim 15, wherein the, 0 wt.-% to 8 wt.-% terpenes is orange terpenes.

* * * * *